United States Patent
Gharavi et al.

(10) Patent No.: US 10,291,296 B2
(45) Date of Patent: May 14, 2019

(54) TRANSCEIVER FOR MULTI-BEAM AND RELAY WITH 5G APPLICATION

(71) Applicant: Movandi Corporation, Newport Beach, CA (US)

(72) Inventors: Sam Gharavi, Irvine, CA (US); Ahmadreza Rofougaran, Newport Coast, CA (US); Farid Shirinfar, Granada Hills, CA (US); Michael Boers, South Turramurra (AU); Seunghwan Yoon, Irvine, CA (US); Alfred Grau Besoli, Irvine, CA (US); Maryam Rofougaran, Rancho Palos Verdes, CA (US)

(73) Assignee: Movandi Corporation, Newport Beach, CA (US)

( * ) Notice: Subject to any disclaimer, the term of this patent is extended or adjusted under 35 U.S.C. 154(b) by 0 days.

(21) Appl. No.: 15/640,174

(22) Filed: Jun. 30, 2017

(65) Prior Publication Data
US 2018/0069605 A1 Mar. 8, 2018

Related U.S. Application Data

(63) Continuation-in-part of application No. 15/600,443, filed on May 19, 2017, which is a continuation of
(Continued)

(51) Int. Cl.
*H04B 7/04* (2017.01)
*H04B 7/06* (2006.01)
(Continued)

(52) U.S. Cl.
CPC .............. *H04B 7/04* (2013.01); *H01Q 3/28* (2013.01); *H01Q 3/36* (2013.01);
(Continued)

(58) Field of Classification Search
CPC ....... H04B 7/04–7/0413; H04B 7/0617; H04B 7/185; H01Q 3/28; H01Q 3/36; H01Q 21/0025
See application file for complete search history.

(56) References Cited

U.S. PATENT DOCUMENTS 2,579,324 A 12/1951 Kock
2,652,189 A 9/1953 Gorman
(Continued)

OTHER PUBLICATIONS

Abbaspour-Tamijani et al., "Enhancing the Directivity of Phased Array Antennas Using Lens-Arrays," Progress In Electromagnetics Research M, vol. 29, 2013. pp. 41-64.
(Continued)

*Primary Examiner* — Raymond S Dean
(74) *Attorney, Agent, or Firm* — Farjami & Farjami LLP

(57) ABSTRACT

A wireless transceiver using a phased array antenna panel for producing multiple beams includes receive antennas forming a receive configuration and transmit antennas forming a transmit configuration. The receive antennas form a plurality of receive beams and the transmit antennas form a plurality of transmits beams, based on phase and amplitude information provided by a master chip in the phased array antenna panel. The receive and transmit configurations can include sub-configurations, each sub-configuration forming one of the plurality of receive beams or one of the plurality of transmit beams. At least one receive antenna and at least one transmit antenna can be connected to a corresponding plurality of receive phase shifters and a corresponding plurality of transmit phase shifters respectively. The wireless transceiver can form a relay transmit beam based on a receive beam provided by a hardwire connection.

4 Claims, 15 Drawing Sheets

Related U.S. Application Data application No. 15/256,038, filed on Sep. 2, 2016, now Pat. No. 9,692,489.

(51) Int. Cl.
  *H04B 7/185* (2006.01)
  *H01Q 3/28* (2006.01)
  *H01Q 3/36* (2006.01)
  *H01Q 21/00* (2006.01)

(52) U.S. Cl.
  CPC ........ *H01Q 21/0025* (2013.01); *H04B 7/0617* (2013.01); *H04B 7/185* (2013.01)

(56) References Cited

U.S. PATENT DOCUMENTS

| | | | |
|---|---|---|---|
| 3,836,973 | A | 9/1974 | Shnitkin et al. |
| 4,380,013 | A | 4/1983 | Slysh |
| 4,739,334 | A | 4/1988 | Soref |
| 4,827,276 | A | 5/1989 | Fukuzawa et al. |
| 4,829,314 | A | 5/1989 | Barbier et al. |
| 5,384,575 | A | 1/1995 | Wu |
| 5,936,577 | A | 8/1999 | Shoki |
| 5,936,588 | A | 8/1999 | Rao |
| 6,297,774 | B1 | 10/2001 | Chung |
| 6,307,507 | B1 * | 10/2001 | Gross ............... H01Q 1/288 342/354 |
| 6,808,237 | B2 | 10/2004 | Schmid et al. |
| 6,891,511 | B1 | 5/2005 | Angelucci |
| 6,911,956 | B2 | 6/2005 | Miyata |
| 7,170,442 | B2 | 1/2007 | Lovberg et al. |
| 7,277,728 | B1 * | 10/2007 | Kauhanen ........... H01Q 1/246 455/561 |
| 7,664,193 | B2 | 2/2010 | Jalali |
| 7,982,555 | B2 | 7/2011 | Rofougaran |
| 8,274,443 | B2 | 9/2012 | Hauhe et al. |
| 8,589,003 | B2 | 11/2013 | Brand et al. |
| 8,618,983 | B2 * | 12/2013 | Chen ............... H01Q 3/2694 342/368 |
| 9,537,214 | B2 | 1/2017 | Corman et al. |
| 9,638,795 | B2 | 5/2017 | Ahmed |
| 9,692,489 | B1 | 6/2017 | Rofougaran |
| 9,722,322 | B2 | 8/2017 | Bertin et al. |
| 9,819,410 | B1 * | 11/2017 | Azevedo ............ H04B 7/18515 |
| 2002/0165001 | A1 | 11/2002 | Phillips et al. |
| 2003/0122724 | A1 | 7/2003 | Shelley et al. |
| 2004/0080455 | A1 | 4/2004 | Lee |
| 2004/0196184 | A1 | 10/2004 | Hollander |
| 2005/0205720 | A1 | 9/2005 | Peltz et al. |
| 2006/0128336 | A1 | 6/2006 | Waltman et al. |
| 2006/0273959 | A1 * | 12/2006 | Kawasaki ............ H01Q 3/267 342/368 |
| 2008/0100504 | A1 | 5/2008 | Martin et al. |
| 2010/0090898 | A1 * | 4/2010 | Gallagher ............ H01Q 3/26 342/373 |
| 2010/0261440 | A1 | 10/2010 | Corman et al. |
| 2011/0025432 | A1 | 2/2011 | Gagnon et al. |
| 2011/0291891 | A1 * | 12/2011 | Nsenga ............. H04B 7/0617 342/373 |
| 2012/0143407 | A1 | 6/2012 | Murthy |
| 2012/0272857 | A1 | 11/2012 | Graab et al. |
| 2013/0023210 | A1 | 1/2013 | Rofougaran |
| 2013/0069831 | A1 | 3/2013 | Friedman |
| 2013/0088393 | A1 | 4/2013 | Lee |
| 2013/0173094 | A1 | 7/2013 | Cooper et al. |
| 2013/0208608 | A1 * | 8/2013 | Piazza ............... H01Q 1/007 370/252 |
| 2014/0009347 | A1 | 1/2014 | Bertin et al. |
| 2014/0022109 | A1 | 1/2014 | Lee |
| 2014/0035780 | A1 | 2/2014 | Trotta |
| 2014/0129060 | A1 | 5/2014 | Cooper et al. |
| 2014/0184439 | A1 | 7/2014 | Ainspan et al. |
| 2014/0191905 | A1 | 7/2014 | Kamgaing |
| 2014/0210668 | A1 | 7/2014 | Wang et al. |
| 2015/0015449 | A1 | 1/2015 | Jecko et al. |
| 2015/0129668 | A1 | 5/2015 | Kam et al. |
| 2015/0324683 | A1 | 11/2015 | Linfield |
| 2016/0141248 | A1 | 5/2016 | Pueschner et al. |
| 2016/0240919 | A1 * | 8/2016 | Wu .............. H01Q 1/246 |
| 2017/0054216 | A1 | 2/2017 | Shi et al. |

OTHER PUBLICATIONS

Advisory Action in U.S. Appl. No. 15/724,638 dated May 25, 2018.
Final Office Action in U.S. Appl. No. 15/724,638 dated Mar 14, 2018.
Final Office Action in U.S. Appl. No. 14/488,355 dated Mar 4, 2016.
Imbert et al., "Design and Performance Evaluation of a Dielectric Flat Lens Antenna for Millimeter-Wave Applications," IEEE Antennas and Wireless Propagation Letters, vol. 14, 2015. pp. 1-4.
International Search Report and Written Opinion in PCT/US2014/055984 dated Jun 18, 2015, pp. 1-12.
Non-Final Office Action in U.S. Appl. No. 14/488,355 dated Nov 13, 2015.
Non-Final Office Action in U.S. Appl. No. 15/225,071 dated Aug 21, 2017.
Non-Final Office Action in U.S. Appl. No. 15/278,970 dated Jan 3, 2018.
Non-Final Office Action in U.S. Appl. No. 15/279,171 dated Apr 24, 2018.
Non-Final Office Action in U.S. Appl. No. 15/279,219 dated Dec 27, 2017.
Non-Final Office Action in U.S. Appl. No. 15/335,034 dated Apr 6, 2018.
Non-Final Office Action in U.S. Appl. No. 15/356,172 dated Mar 14, 2018.
Non-Final Office Action in U.S. Appl. No. 15/600,443 dated Dec 27, 2017.
Non-Final Office Action in U.S. Appl. No. 15/724,638 dated Nov 6, 2017.
Notice of Allowance in U.S. Appl. No. 14/488,355 dated Jun 8, 2016.
Notice of Allowance in U.S. Appl. No. 15/225,071 dated Nov 22, 2017.
Notice of Allowance in U.S. Appl. No. 15/255,656 dated Apr 10, 2018.
Notice of Allowance in U.S. Appl. No. 15/256,038 dated Apr 19, 2017.
Restriction Requirement in U.S. Appl. No. 15/279,171 dated Dec 21, 2017.

* cited by examiner

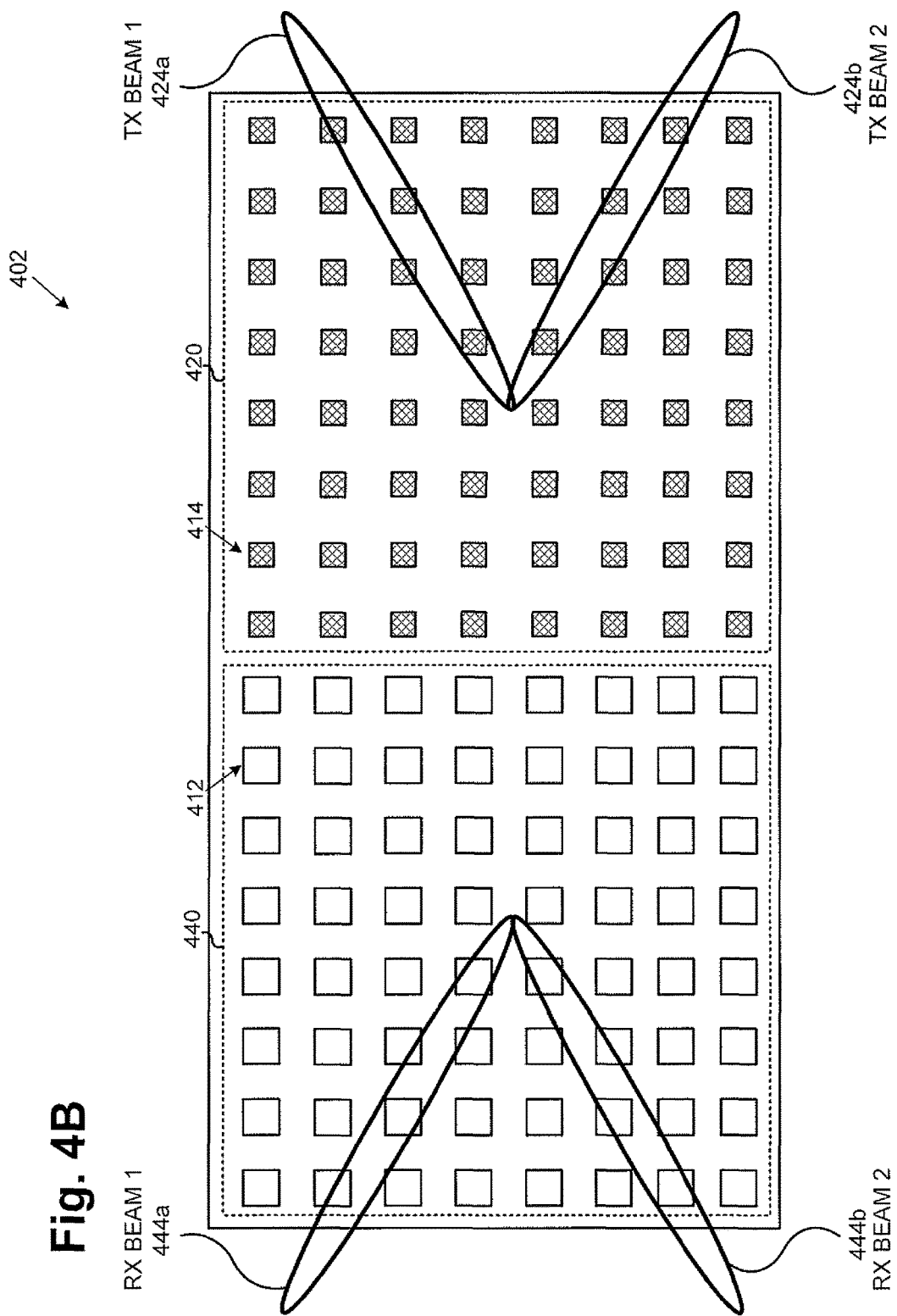

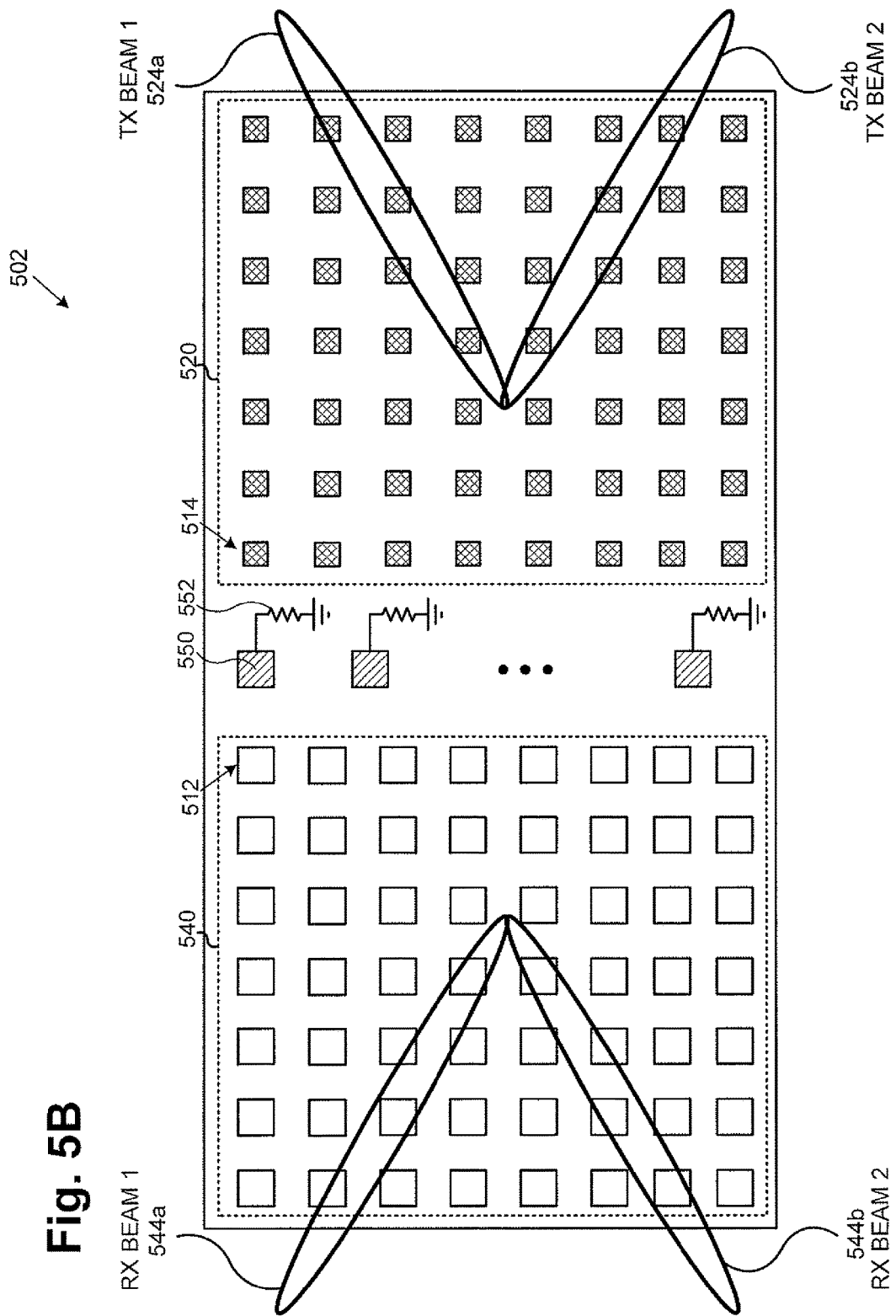

TRANSCEIVER FOR MULTI-BEAM AND RELAY WITH 5G APPLICATION

CLAIMS OF PRIORITY

The present application is a continuation-in-part of and claims the benefit of and priority to application Ser. No. 15/600,443 filed on May 19, 2017, titled "Transceiver for Concurrently Transmitting and Receiving Wireless Signals," which itself is a continuation of and claims the benefit of and priority to application Ser. No. 15/256,038 filed on Sep. 2, 2016, titled "Transceiver Using Novel Phased Array Antenna Panel for Concurrently Transmitting and Receiving Wireless Signals." The disclosures of these applications are hereby incorporated fully by reference into the present application.

RELATED APPLICATION(S)

The present application is related to U.S. patent application Ser. No. 15/225,071, filed on Aug. 1, 2016, and titled "Wireless Receiver with Axial Ratio and Cross-Polarization Calibration," and U.S. patent application Ser. No. 15/225,523, filed on Aug. 1, 2016, and titled "Wireless Receiver with Tracking Using Location, Heading, and Motion Sensors and Adaptive Power Detection," and U.S. patent application Ser. No. 15/226,785, filed on Aug. 2, 2016, and titled "Large Scale Integration and Control of Antennas with Master Chip and Front End Chips on a Single Antenna Panel," and U.S. patent application Ser. No. 15/255,656, filed on Sep. 2, 2016, and titled "Novel Antenna Arrangements and Routing Configurations in Large Scale Integration of Antennas with Front End Chips in a Wireless Receiver," and U.S. patent application Ser. No. 15/256,038 filed on Sep. 2, 2016, and titled "Transceiver Using Novel Phased Array Antenna Panel for Concurrently Transmitting and Receiving Wireless Signals," and U.S. patent application Ser. No. 15/256,222 filed on Sep. 2, 2016, and titled "Wireless Transceiver Having Receive Antennas and Transmit Antennas with Orthogonal Polarizations in a Phased Array Antenna Panel," and U.S. patent application Ser. No. 15/278,970 filed on Sep. 28, 2016, and titled "Low-Cost and Low-Loss Phased Array Antenna Panel," and U.S. patent application Ser. No. 15/279,171 filed on Sep. 28, 2016, and titled "Phased Array Antenna Panel Having Cavities with RF Shields for Antenna Probes," and U.S. patent application Ser. No. 15/279,219 filed on Sep. 28, 2016, and titled "Phased Array Antenna Panel Having Quad Split Cavities Dedicated to Vertical-Polarization and Horizontal-Polarization Antenna Probes," and U.S. patent application Ser. No. 15/335,034 filed on Oct. 26, 2016, and titled "Lens-Enhanced Phased Array Antenna Panel," and U.S. patent application Ser. No. 15/335,179 filed on Oct. 26, 2016, and titled "Phased Array Antenna Panel with Configurable Slanted Antenna Rows," and U.S. patent application Ser. No. 15/355,967 filed on Nov. 18, 2016, and titled "Phased Array Antenna Panel with Enhanced Isolation and Reduced Loss," and U.S. patent application Ser. No. 15/356,172 filed on Nov. 18, 2016, and titled "Phased Array Antenna Panel Having Reduced Passive Loss of Received Signals," and U.S. patent application Ser. No. 15/432,018 filed on Feb. 14, 2017, and titled "Outphasing Transmit and Receive Wireless Systems Having Dual-Polarized Antennas," and U.S. patent application Ser. No. 15/432,091 filed on Feb. 14, 2017, and titled "Outphasing Transmitters with Improved Wireless Transmission Performance and Manufacturability," and U.S. patent application Ser. No. 15/432,185 filed on Feb. 14, 2017, and titled "Multi-Beam Outphasing Transmitters," and U.S. patent application Ser. No. 15/488,355 filed on Apr. 14, 2017, and titled "Raised Antenna Patches with Air Dielectrics for Use in Large Scale Integration of Phased Array Antenna Panels." The disclosures of all of these related applications are hereby incorporated fully by reference into the present application.

BACKGROUND

Phased array antenna panels with large numbers of antennas integrated on a single board are being developed in view of higher wireless communication frequencies being used in the evolving 5G wireless communications (5th generation mobile networks or 5th generation wireless systems). Phased array antenna panels are capable of beamforming by phase shifting and amplitude control techniques, and without physically changing direction or orientation of the phased array antenna panels, and without a need for mechanical parts to effect such changes in direction or orientation. However, there is need in the art to improve performance of phased array antenna panels in high frequency applications, for example, when multiple beams may need to be received or transmitted, or when amplification and re-direction of beams are needed. Moreover, inability to easily reconfigure the phased array antenna panel renders it difficult to rectify these impairments after manufacturing or deployment. Thus, there is a need in the art to use phased array antenna panels to achieve wireless communication systems that overcome the deficiencies in the art.

SUMMARY

The present disclosure is directed to a transceiver for multi-beam and relay with 5G application, substantially as shown in and/or described in connection with at least one of the figures, and as set forth in the claims.

BRIEF DESCRIPTION OF THE DRAWINGS

FIGS. 4A and 4B illustrate top plan views of portions of phased array antenna panels of exemplary wireless transceivers according to various implementations of the present application.

FIGS. 5A and 5B illustrate top plan views of portions of phased array antenna panels of exemplary wireless transceivers according to various implementations of the present application.

DETAILED DESCRIPTION

Figure 1:
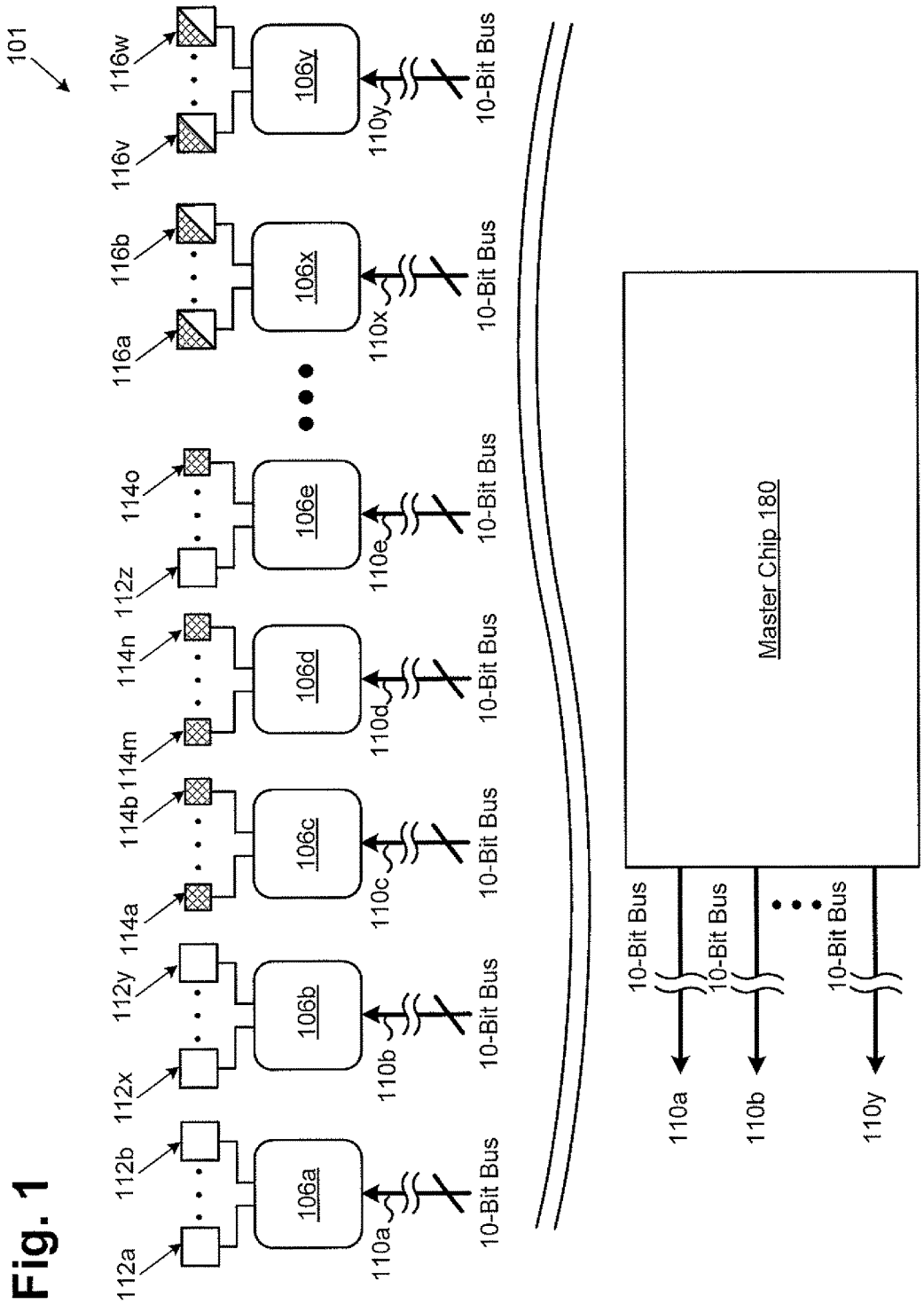
FIG. 1 illustrates a functional block diagram of a portion of an exemplary wireless transceiver according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Referring now to FIG. 1, FIG. 1 illustrates a functional block diagram of a portion of an exemplary wireless transceiver according to one implementation of the present application. As illustrated in FIG. 1, wireless transceiver 101 includes radio frequency (RF) front end chips 106a, 106b, 106c, 106d, 106e, 106x, and 106y (collectively referred to as RF front end chips 106a through 106y), receive antennas 112a, 112b, 112x, 112y and 112z (collectively referred to as receive antennas 112a through 112z), transmit antennas 114a, 114b, 114m, 114n and 114o (collectively referred to as transmit antennas 114a through 114o), reconfigurable receive/transmit antennas 116a, 116b, 116v and 116w (collectively referred to as reconfigurable receive/transmit antennas 116a through 116w), and master chip 180. In the present implementation, wireless transceiver 101 includes receive antennas 112a through 112z, transmit antennas 114a through 114o and reconfigurable receive/transmit antennas 116a through 116w in a single phased array antenna panel for concurrently transmitting and receiving wireless signals.

As can be seen in FIG. 1, RF front end chip 106a is connected to a group of receive antennas, such as receive antennas 112a and 112b, while RF front end chip 106b is connected to a group of receive antennas, such as receive antennas 112x and 112y. RF front end chip 106c is connected to a group of transmit antennas, such as transmit antennas 114a and 114b, while RF front end chip 106d is connected to a group of transmit antennas, such as transmit antennas 114m and 114n. RF front end chip 106e is connected to one or more receive antennas, such as receive antenna 112z, and one or more transmit antennas, such as transmit antenna 114o. RF front end chip 106x is connected to a group of reconfigurable receive/transmit antennas, such as reconfigurable receive/transmit antennas 116a and 116b, while RF front end chip 106y is connected to a group of reconfigurable receive/transmit antennas, such as reconfigurable receive/transmit antennas 116v and 116w.

It should be noted that total numbers of receive antennas, transmit antennas, and reconfigurable receive/transmit antennas may vary to suit the specific needs of a particular application. For example, in one implementation, wireless transceiver 101 may include only receive antennas and transmit antennas in a single phased array antenna panel. In another implementation, wireless transceiver 101 may include receive antennas, transmit antennas, and reconfigurable receive/transmit antennas in a single phased array antenna panel. In yet another implementation, wireless transceiver 101 may include only reconfigurable receive/transmit antennas in a single phased array antenna panel.

In the present implementation, each receive antenna, such as receive antennas 112a through 112z, of wireless transceiver 101 may operate in a reception mode and provide a horizontally-polarized signal and a vertically-polarized signal, as a pair of linearly polarized signals, to a corresponding RF front end chip, such as RF front end chips 106a, 106b and 116e. Each of the RF front end chips may combine all of the horizontally-polarized signals, by adding powers and combining phases of the individual horizontally-polarized signals, from the group of corresponding receive antennas coupled thereto, and provide an H-combined output (not explicitly shown in FIG. 1) to master chip 180. Similarly, each of the RF front end chips may also combine all of the vertically-polarized signals, by adding powers and combining phases of the individual vertically-polarized signals, from the group of corresponding receive antennas coupled thereto, and provide a V-combined output (not explicitly shown in FIG. 1) to master chip 180. In the present implementation, master chip 180 is configured to receive the H-combined and V-combined outputs from each of the RF front end chips coupled to the receive antennas, and provide phase shift information/signals to phase shifters and amplitude control information/signals to various amplifiers (not explicitly shown in FIG. 1) in the RF front end chips through control buses, such as control buses 110a, 110b and 110e.

In the present implementation, each transmit antenna, such as transmit antennas 114a through 114o, of wireless transceiver 101 may operate in a transmission mode, and transmit a horizontally-polarized signal and a vertically-polarized signal, as a pair of linearly polarized signals, provided by a corresponding RF front end chip, such as RF front end chips 106c, 106d and 106e. In the present implementation, master chip 180 is configured to provide phase shift information/signals to phase shifters and amplitude control information/signals to various amplifiers (not explicitly shown in FIG. 1) in the RF front end chips through control buses, such as control buses 110c, 110d and 110e, to control amplitude and phase of horizontally-polarized signals and a vertically-polarized signals being transmitted by transmit antennas 114a through 114o.

In the present implementation, receive antennas 112a through 112z, and optionally one or more reconfigurable receive/transmit antennas 116a through 116w, form a receive beam at a receive frequency based on phase and amplitude information provided by master chip 180 to corresponding RF front end chips 106a, 106b and 106e in a phased array antenna panel, such as phased array antenna panel 202 shown in FIGS. 2A through 2F. Transmit antennas 114a through 114o, and optionally one or more reconfigurable receive/transmit antennas 116a through 116w, form a transmit beam at a transmit frequency based on phase and amplitude information provided by master chip 180 to corresponding RF front end chips 106c, 106d and 106e in the phased array antenna panel.

In the present implementation, each reconfigurable receive/transmit antenna, such as reconfigurable receive/transmit antennas 116a through 116w, of wireless transceiver 101 is coupled to a corresponding RF front end chip, and may operate in either the reception or transmission mode. For example, each reconfigurable receive/transmit antenna may receive or transmit a horizontally-polarized signal and a vertically-polarized signal, as a pair of linearly polarized signals, depending on the mode of operation it is in. Wireless transceiver 101 is configured to dynamically assign reconfigurable receive/transmit antennas 116a through 116w to operate in either the reception or transmission mode. As a consequence, the total number of the transmit antennas or the total number of the receive antennas on the phased array antenna panel can be increased.

For example, when reconfigurable receive/transmit antennas 116a through 116w are assigned to operate in the reception mode, each reconfigurable receive/transmit antenna may provide a horizontally-polarized signal and a vertically-polarized signal, as a pair of linearly polarized signals, to a corresponding RF front end chip, such as RF front end chips 106x and 116y. Each of the RF front end chips may combine all of the horizontally-polarized signals, by adding powers and combining phases of the individual horizontally-polarized signals, from the group of corresponding reconfigurable receive/transmit antennas coupled thereto, and provide an H-combined output (not explicitly shown in FIG. 1) to master chip 180. Similarly, each of the RF front end chips may also combine all of the vertically-polarized signals, by adding powers and combining phases of the individual vertically-polarized signals, from the group of corresponding reconfigurable receive/transmit antennas coupled thereto, and provide a V-combined output (not explicitly shown in FIG. 1) to master chip 180. Master chip 180 is configured to receive the H-combined and V-combined outputs from each of the RF front end chips coupled to the reconfigurable receive/transmit antennas, and provide phase shift signals to phase shifters, and amplitude control signals to various amplifiers, in the RF front end chips through control buses, such as control buses 110x and 110y.

For example, when reconfigurable receive/transmit antennas 116a through 116w are assigned to operate in the transmission mode, each reconfigurable receive/transmit antenna may transmit a horizontally-polarized signal and a vertically-polarized signal, as a pair of linearly polarized signals, provided by a corresponding RF front end chip, such as RF front end chips 106x and 106y.

It should be understood that wireless transceiver 101 may assign only a portion of reconfigurable receive/transmit antennas 116a through 116w to operate in the transmission mode, while assign another portion of reconfigurable receive/transmit antennas 116a through 116w to operate in the reception mode. For example, reconfigurable receive/transmit antennas 116a and 116b, although both coupled to RF front end chip 106x, may be assigned to different operation modes, with one in the transmission mode and the other one in the reception mode.

In one implementation, master chip 180 is configured to drive in parallel control buses 110a through 110y. By way of one example, and without limitation, control buses 110a through 110y are ten-bit control buses in the present implementation. In one implementation, RF front end chips 106a through 106y, and all the receive, transmit, and reconfigurable transmit/receiver antennas coupled to corresponding RF front end chips 106a through 106y, and master chip 180 are integrated on a single substrate, such as a printed circuit board.

Figure 2A:
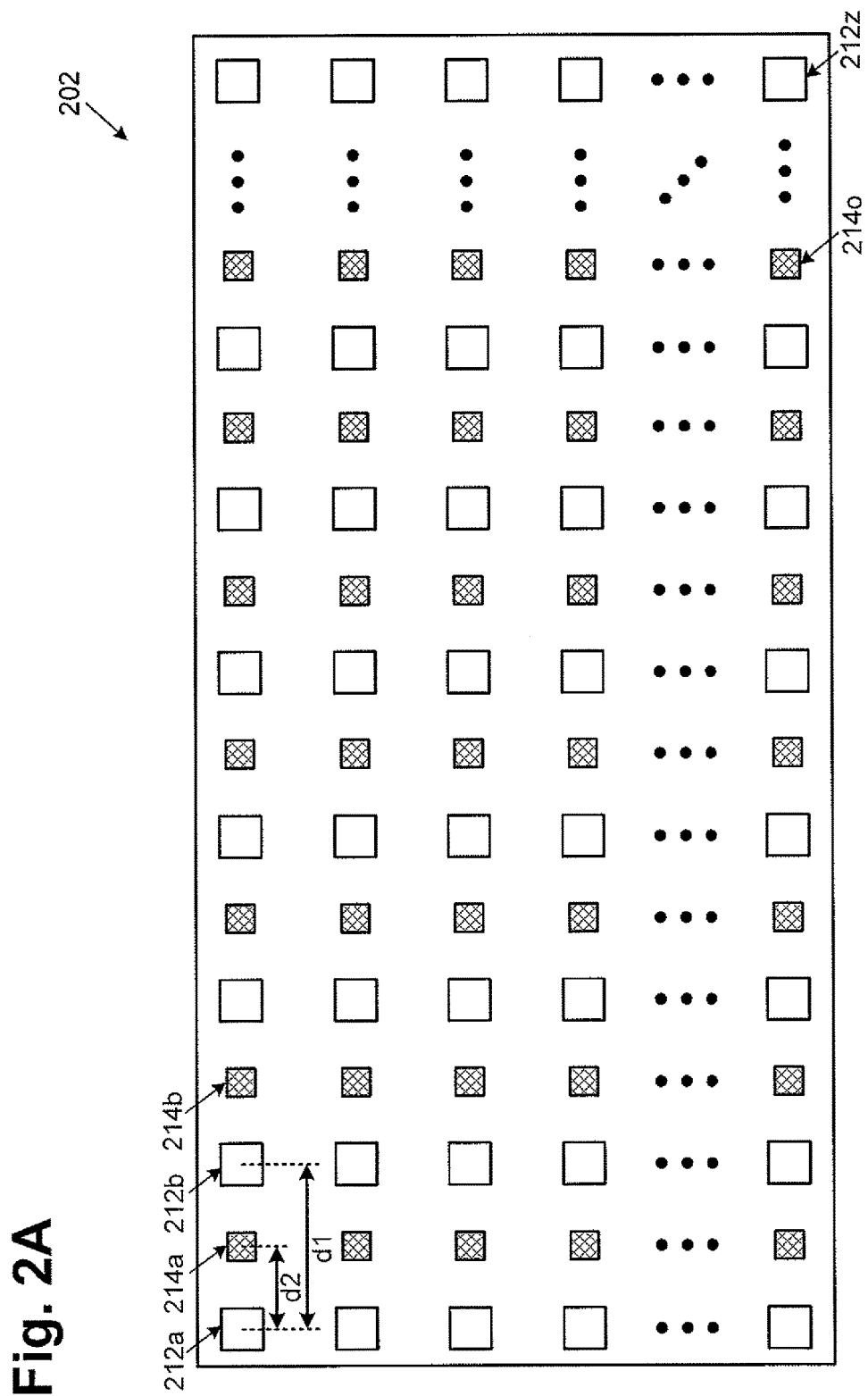
FIGS. 2A, 2B, 2C, 2D, 2E, and 2F illustrate top plan views of portions of phased array antenna panels of exemplary wireless transceivers according to various implementations of the present application.

Referring now to FIG. 2A, FIG. 2A illustrates a top plan view of a portion of a phased array antenna panel of an exemplary wireless transceiver according to one implementation of the present application. As illustrated in FIG. 2A, phased array antenna panel 202 includes receive antennas, such as receive antennas 212a, 212b and 212z (collectively referred to as receive antennas 212a through 212z). Phased array antenna panel 202 also includes transmit antennas, such as transmit antennas 214a, 214b and 214o (collectively referred to as transmit antennas 214a through 214o). As illustrated in FIG. 2A, receive antennas 212a through 212z and transmit antennas 214a through 214o form an alternating configuration where receive antennas 212a through 212z and transmit antennas 214a through 214o are approximately evenly interspaced in phased array antenna panel 202.

As shown in FIG. 2A, receive antennas 212a and 212b are separated by distance d1, while receive antenna 212a and transmit antenna 214a are separated by distance d2. In the present implementation, d1=2×d2. In other words, each of the transmit antennas is approximately half-way between two of the receive antennas. In another implementation, there may be multiple transmit antennas between every pair of immediately adjacent receive antennas. In one implementation, the total number of receive antennas 212a through 212z is greater than the total number of transmit antennas 214a through 214o. In another implementation, the total number of receive antennas 212a through 212z and the total number of transmit antennas 214a through 214o may vary to suit the specific needs of a particular application.

As illustrated in FIG. 2A, transmit antennas 214a through 214o in phased array antenna panel 202 may each have a substantially square shape that is slightly smaller than receive antennas 212a through 212z. This is because the receive frequency and the transmit frequency of the wireless transceiver are set to be different to ensure signal isolation between the receive and transmit signals. For example, the receive frequency and the transmit frequency may be separated by approximately 2 GHz to ensure signal isolation.

In one implementation, receive antennas 212a through 212z in phased array antenna panel 202 as shown in FIG. 2A, may be used in conjunction with 5G wireless communications (5th generation mobile networks or 5th generation wireless systems), such as wireless transmitters operating in a frequency range of between 27.5 GHz and 29.5 GHz. In one implementation, for a wireless transmitter transmitting signals at 28.5 GHz (i.e., $\lambda$=10.52 mm), each receive antenna in phased array antenna panel 202 may need an area of at least a half wavelength (i.e., $\lambda/2$=5.26 mm) by a half wavelength (i.e., $\lambda/2$=5.26 mm) to receive signals. As illustrated in FIG. 2A, receive antennas 212a through 212z in phased array antenna panel 202 may each have a substantially square shape having dimensions of 5.26 mm by 5.26 mm, for example. In one implementation, each adjacent pair of receive antennas may be separated by a distance of a multiple integer of the quarter wavelength (i.e., $n*\lambda/4$), such as 2.63 mm, 5.26 mm, 7.89 mm, and etc.

In one implementation, transmit antennas 214a through 214o in phased array antenna panel 202 as shown in FIG. 2A, may be used in conjunction with 5G wireless communications (5th generation mobile networks or 5th generation wireless systems), such as wireless receivers operating in a frequency range of between 27.5 GHz and 29.5 GHz. In one implementation, for a wireless receiver receiving signals at 28.5 GHz (i.e., $\lambda$=10.52 mm), each transmit antenna in phased array antenna panel 202 may need an area of at least a half wavelength (i.e., $\lambda/2$=5.26 mm) by a half wavelength (i.e., $\lambda/2$=5.26 mm) to transmit signals. As illustrated in FIG. 2A, transmit antennas 214a through 214o in phased array antenna panel 202 may each have a substantially square shape having dimensions of 5.26 mm by 5.26 mm, for example. In one implementation, each adjacent pair of transmit antennas may be separated by a distance of a multiple integer of the quarter wavelength (i.e., $n*\lambda/4$), such as 0.63 mm, 5.26 mm, 7.89 mm, and etc.

In another implementation, using much smaller antenna sizes, transmit antennas 214a through 214o in phased array antenna panel 202 may be configured to transmit signals in the 60 GHz frequency range, while receive antennas 212a through 212z in phased array antenna panel 202 may also be configured to receive signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links. In that implementation, transmit antennas 214a through 214o and receive antennas 212a through 212z in phased array antenna panel 202 may have substantially equal sizes (that are both generally smaller than antenna sizes used in 5G communications).

In the present implementation, phased array antenna panel 202 is a flat panel array employing receive antennas 212a through 212z and transmit antennas 214a through 214o, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106a, 106b and 106e in FIG. 1) associated with receive antennas 212a through 212z. In one implementation, the transmission beam is formed fully electronically by means of phase and amplitude control circuits, for example, in RF front end circuits (such as RF front end chips 106c, 106d and 106e in FIG. 1) associated with transmit antennas 214a through 214o. Thus, phased array antenna panel 202 can provide for beamforming for both reception and transmission without the use of any mechanical parts, thereby reducing signal delay, implementation cost and complexity.

Figure 2B:
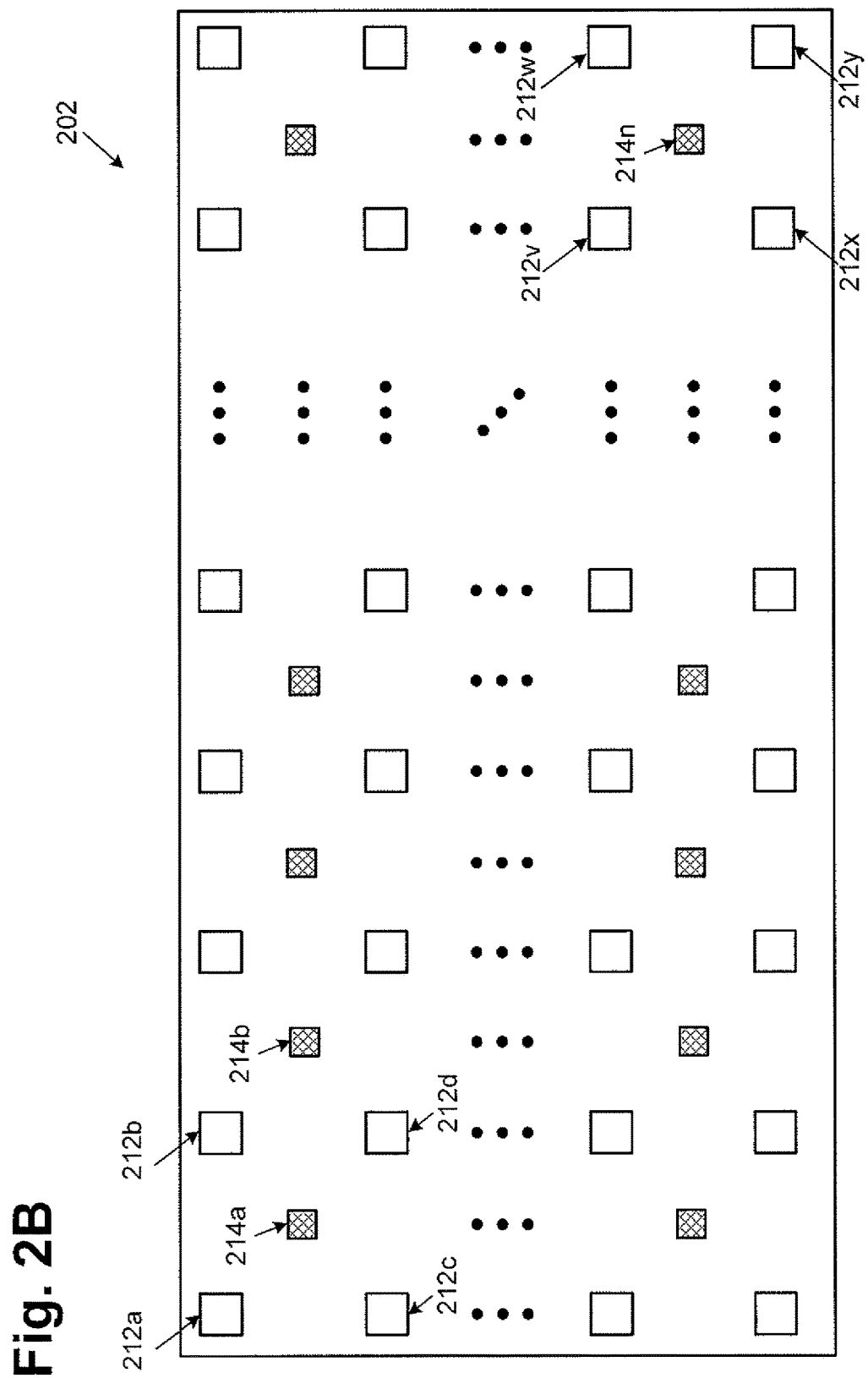

Referring now to FIG. 2B, FIG. 2B illustrates a top plan view of a portion of a phased array antenna panel of an exemplary wireless transceiver according to one implementation of the present application. As illustrated in FIG. 2B, phased array antenna panel 202 includes receive antennas, such as receive antennas 212a, 212b, 212c, 212d, 212v, 212w, 212x and 212y (collectively referred to as receive antennas 212a through 212y). Phased array antenna panel 202 also includes transmit antennas, such as transmit antennas 214a, 214b and 214n (collectively referred to as transmit antennas 214a through 214n). As illustrated in FIG. 2B, receive antennas 212a through 212y and transmit antennas 214a through 214n form a staggered row configuration where receive antennas 212a through 212y and transmit antennas 214a through 214n are arranged in staggered rows. As illustrated in FIG. 2B, transmit antenna 214a is approximately centered between receive antennas 212a, 212b, 212c and 212d, where transmit antenna 214a is spaced from each of receive antennas 212a, 212b, 212c and 212d at substantially equal distances. Similarly, transmit antenna 214n is approximately centered between receive antennas 212v, 212w, 212x and 212y, where transmit antenna 214n is spaced from each of receive antennas 212v, 212w, 212x and 212y at substantially equal distances. In another implementation, there may be multiple transmit antennas between every group of four receive antennas. In one implementation, the total number of receive antennas 212a through 212y is greater than the total number of transmit antennas 214a through 214n. In another implementation, the total number of receive antennas 212a through 212y and the total number of transmit antennas 214a through 214n may vary to suit the specific needs of a particular application.

As illustrated in FIG. 2B, transmit antennas 214a through 214n in phased array antenna panel 202 may each have a substantially square shape, that is slightly smaller than receive antennas 212a through 212y. Similar to FIG. 2A, this is because the receive frequency and the transmit frequency of the wireless transceiver may be set to be different to ensure signal isolation between the receive and transmit signals. For example, the receive frequency and the transmit frequency may be separated by approximately 2 GHz to ensure signal isolation.

In one implementation, receive antennas 212a through 212y in phased array antenna panel 202 as shown in FIG. 2B, may be used in conjunction with 5G wireless communications (5th generation mobile networks or 5th generation wireless systems), such as wireless transmitters operating in a frequency range of between 27.5 GHz and 29.5 GHz. In one implementation, for a wireless transmitter transmitting signals at 28.5 GHz (i.e., $\lambda$=10.52 mm), each receive antenna in phased array antenna panel 202 may need an area of at least a half wavelength (i.e., $\lambda/2$=5.26 mm) by a half wavelength (i.e., $\lambda/2$=5.26 mm) to receive signals. As illustrated in FIG. 2B, receive antennas 212a through 212y in phased array antenna panel 202 may each have a substantially square shape having dimensions of 5.26 mm by 5.26 mm, for example. In one implementation, each adjacent pair of receive antennas may be separated by a distance of a multiple integer of the quarter wavelength (i.e., n*$\lambda/4$), such as 2.63 mm, 5.26 mm, 7.89 mm, and etc.

In one implementation, transmit antennas 214a through 214n in phased array antenna panel 202 as shown in FIG. 2B, may be used in conjunction with 5G wireless communications (5th generation mobile networks or 5th generation wireless systems), such as wireless receivers operating in a frequency range of between 27.5 GHz and 29.5 GHz. In one implementation, for a wireless receiver receiving signals at 28.5 GHz (i.e., $\lambda$=10.52 mm), each transmit antenna in phased array antenna panel 202 may need an area of at least a half wavelength (i.e., $\lambda/2$=5.26 mm) by a half wavelength (i.e., $\lambda2$=5.26 mm) to transmit signals. As illustrated in FIG. 2B, transmit antennas 214a through 214n in phased array antenna panel 202 may each have a substantially square shape having dimensions of 5.26 mm by 5.26 mm, for example. In one implementation, each adjacent pair of transmit antennas may be separated by a distance of a multiple integer of the quarter wavelength (i.e., n*$\lambda/4$), such as 0.63 mm, 5.26 mm, 7.89 mm, and etc.

In another implementation, using much smaller antenna sizes, transmit antennas 214a through 214n in phased array antenna panel 202 may be configured to transmit signals in the 60 GHz frequency range, while receive antennas 212a through 212y in phased array antenna panel 202 may also be configured to receive signals in the 60 GHz frequency range. In that implementation, transmit antennas 214a through 214n and receive antennas 212a through 212y in phased array antenna panel 202 may have substantially equal sizes (that are both generally smaller than antenna sizes used in 5G communications).

In the present implementation, phased array antenna panel 202 is a flat panel array employing receive antennas 212a through 212y and transmit antennas 214a through 214n, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106a and 106b in FIG. 1) associated with receive antennas 212a through 212y. In one implementation, the transmission beam is formed fully electronically by means of phase and amplitude control circuits, for example, in RF front end circuits (such as RF front end chips 106c and 106d in FIG. 1) associated with transmit antennas 214a through 214n. Thus, phased array antenna panel 202 can provide for beamforming for both reception and transmission without the use of any mechanical parts, thereby reducing signal delay, implementation cost and complexity.

Figure 2C:
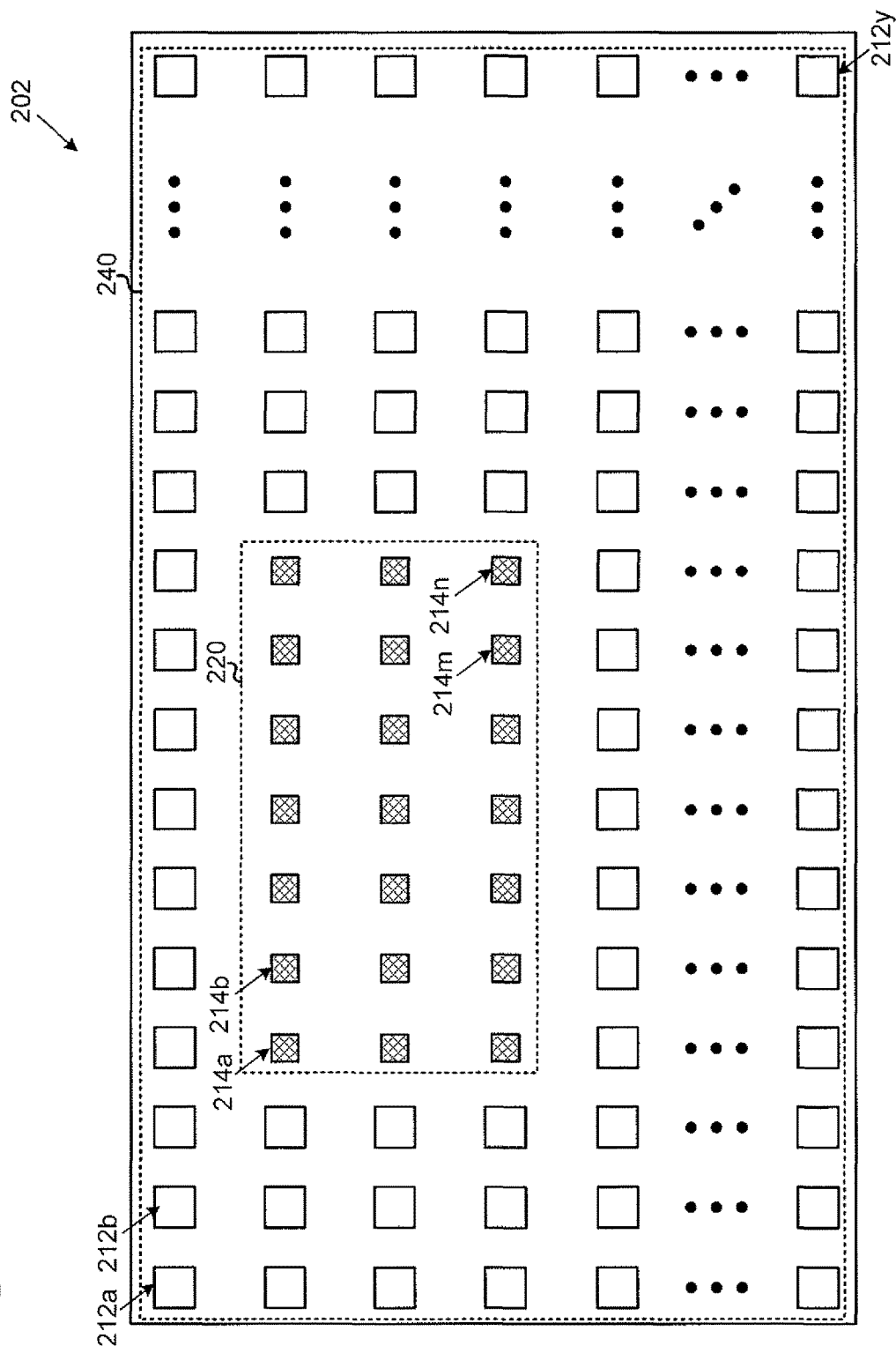

Referring now to FIG. 2C, FIG. 2C illustrates a top plan view of a portion of a phased array antenna panel of an exemplary wireless transceiver according to one implementation of the present application. As illustrated in FIG. 2C, phased array antenna panel 202 includes receive antennas, such as receive antennas 212a, 212b and 212y (collectively referred to as receive antennas 212a through 212y). Phased array antenna panel 202 also includes transmit antennas, such as transmit antennas 214a, 214b, 214m and 214n (collectively referred to as transmit antennas 214a through 214n).

As illustrated in FIG. 2C, receive antennas 212a through 212y are in receive configuration 240. In the present implementation, receive configuration 240 includes a cluster of receive antennas. Transmit antennas 214a through 214n are in transmit configuration 220. In the present implementation, transmit configuration 220 includes a rectangular cluster of transmit antennas. As illustrated in FIG. 2C, the cluster of transmit antennas 214a through 214n is a rectangular cluster of transmit antennas surrounded by the cluster of receive antennas 212a through 212y. In one implementation, the total number of receive antennas 212a through 212y is greater than the total number of transmit antennas 214a through 214n. In another implementation, the number of receive antennas in receive configuration 240 and the number of transmit antennas in transmit configuration 220 may vary to suit the specific needs of a particular application.

As illustrated in FIG. 2C, transmit antennas 214a through 214n may each have a substantially square shape, that is slightly smaller than receive antennas 212a through 212y. Similar to FIG. 2A, this is because the receive frequency and the transmit frequency of the wireless transceiver may be set to be different to ensure signal isolation between the receive and transmit signals. For example, the receive frequency and the transmit frequency may be separated by approximately 2 GHz to ensure signal isolation.

In one implementation, receive antennas 212a through 212y and transmit antennas 214a through 214n in phased array antenna panel 202 may be used in conjunction with 5G wireless communications (5th generation mobile networks or 5th generation wireless systems), such as wireless transceivers operating in a frequency range of between 27.5 GHz and 29.5 GHz. In one implementation, for a wireless transceiver transmitting signals at 28.5 GHz (i.e., $\lambda=10.52$ mm), each receive antenna and transmit antenna in phased array antenna panel 202 may need an area of at least a half wavelength (i.e., $\lambda/2=5.26$ mm) by a half wavelength (i.e., $\lambda/2=5.26$ mm) to receive signals. As illustrated in FIG. 2C, receive antennas 212a through 212y and transmit antennas 214a through 214n in phased array antenna panel 202 may each have a substantially square shape having dimensions of 5.26 mm by 5.26 mm, for example. In one implementation, each adjacent pair of receive antennas and each adjacent pair of transmit antennas may be separated by a distance of a multiple integer of the quarter wavelength (i.e., $n*\lambda/4$), such as 2.63 mm, 5.26 mm, 7.89 mm, and etc.

In another implementation, using much smaller antenna sizes, transmit antennas 214a through 214n in phased array antenna panel 202 may be configured to transmit signals in the 60 GHz frequency range, while receive antennas 212a through 212y in phased array antenna panel 202 may also be configured to receive signals in the 60 GHz frequency range. In that implementation, transmit antennas 214a through 214n and receive antennas 212a through 212y in phased array antenna panel 202 may have substantially equal sizes (that are both generally smaller than antenna sizes used in 5G communications).

In the present implementation, phased array antenna panel 202 is a flat panel array employing receive antennas 212a through 212y and transmit antennas 214a through 214n, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106a and 106b in FIG. 1) associated with receive antennas 212a through 212y. In one implementation, the transmission beam is formed fully electronically by means of phase and amplitude control circuits, for example, in RF front end circuits (such as RF front end chips 106c and 106d in FIG. 1) associated with transmit antennas 214a through 214n. Thus, phased array antenna panel 202 can provide for beamforming for both reception and transmission without the use of any mechanical parts, thereby reducing signal delay, implementation cost and complexity.

Figure 2D:
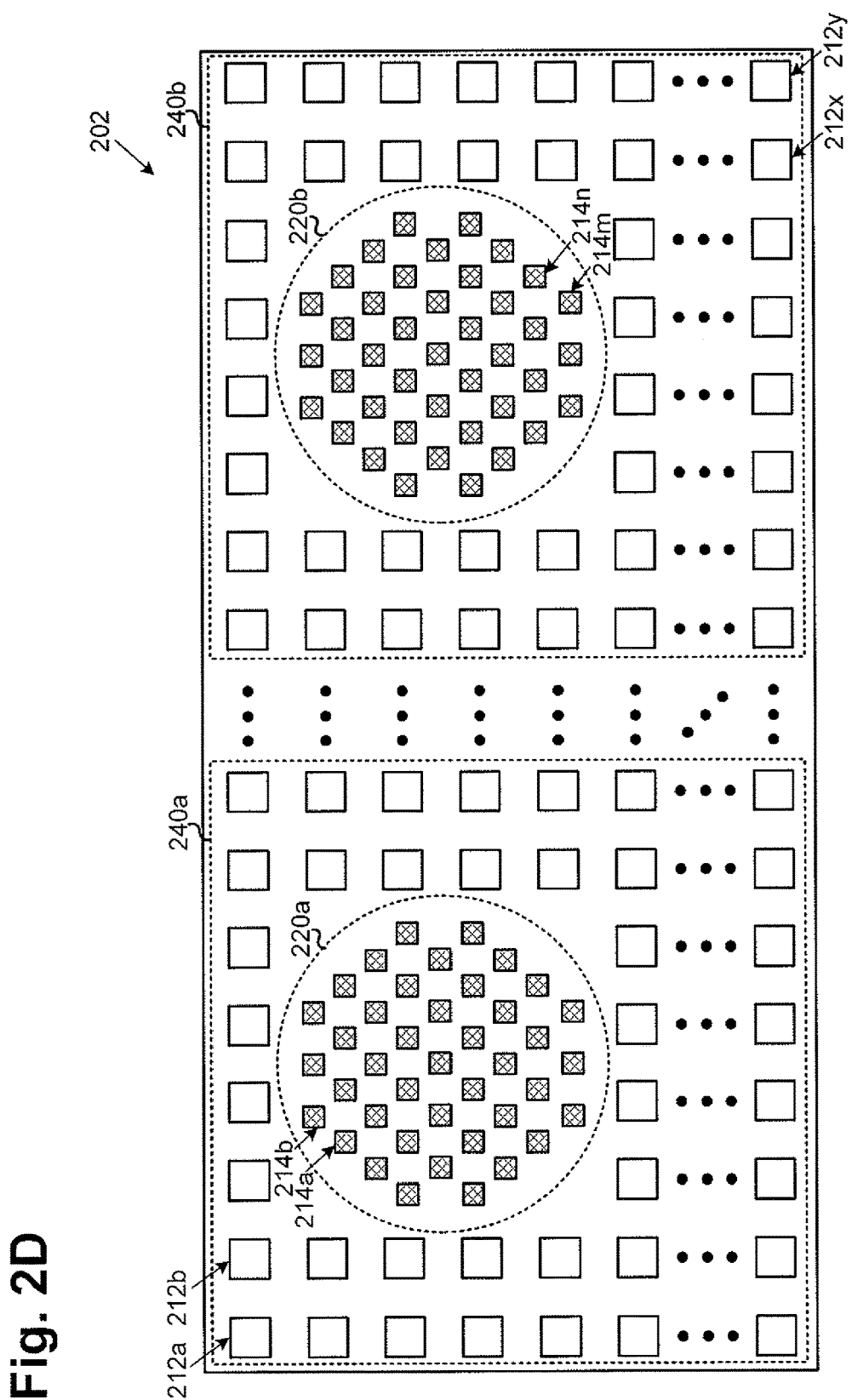

Referring now to FIG. 2D, FIG. 2D illustrates a top plan view of a portion of a phased array antenna panel of an exemplary wireless transceiver according to one implementation of the present application. As illustrated in FIG. 2D, phased array antenna panel 202 includes receive antennas, such as receive antennas 212a, 212b, 212x and 212y (collectively referred to as receive antennas 212a through 212y). Phased array antenna panel 202 also includes transmit antennas, such as transmit antennas 214a, 214b, 214m and 214n (collectively referred to as transmit antennas 214a through 214n).

As illustrated in FIG. 2D, a portion of receive antennas 212a through 212y are in receive configuration 240a, while another portion of receive antennas 212a through 212y are in receive configuration 240b. In the present implementation, each of receive configurations 240a and 240b includes a cluster of receive antennas. As further illustrated in FIG. 2D, a portion of transmit antennas 214a through 214n is in transmit configuration 220a, while another portion of transmit antennas 214a through 214n is in transmit configuration 220b. In the present implementation, each of transmit configurations 220a and 220b is a non-rectangular cluster of transmit antennas. As shown in FIG. 2D, the cluster of transmit antennas in transmit configuration 220a is a substantially circular cluster of transmit antennas surrounded by the cluster of receive antennas in receive configuration 240a. Similarly, the cluster of transmit antennas in transmit configuration 220b is a substantially circular cluster of transmit antennas surrounded by the cluster of receive antennas in receive configuration 240b.

In one implementation, the total number of receive antennas 212a through 212y is greater than the total number of transmit antennas 214a through 214n. In another implementation, the number of receive antennas in receive configuration 240a and the number of transmit antennas in transmit configuration 220a may vary to suit the needs of a particular application. Similarly, the number of receive antennas in receive configuration 240b and the number of transmit antennas in transmit configuration 220b may vary to suit the needs of a particular application.

As illustrated in FIG. 2D, transmit antennas 214a through 214n may each have a substantially square shape, that is slightly smaller than receive antennas 212a through 212y. Similar to FIG. 2A, this is because the receive frequency and the transmit frequency of the wireless transceiver may be set to be different to ensure signal isolation between the receive and transmit signals. For example, the receive frequency and the transmit frequency may be separated by approximately 2 GHz to ensure signal isolation.

In one implementation, receive antennas 212a through 212y and transmit antennas 214a through 214n in phased array antenna panel 202 may be used in conjunction with 5G wireless communications (5th generation mobile networks or 5th generation wireless systems), such as wireless transceivers operating in a frequency range of between 27.5 GHz and 29.5 GHz. In one implementation, for a wireless transceiver transmitting signals at 28.5 GHz (i.e., $\lambda=10.52$ mm), each receive antenna and transmit antenna in phased array antenna panel 202 may need an area of at least a half wavelength (i.e., λ/2=5.26 mm) by a half wavelength (i.e., λ/2=5.26 mm) to receive signals. As illustrated in FIG. 2D, receive antennas 212a through 212y and transmit antennas 214a through 214n in phased array antenna panel 202 may each have a substantially square shape having dimensions of 5.26 mm by 5.26 mm, for example. In one implementation, each adjacent pair of receive antennas and each adjacent pair of transmit antennas may be separated by a distance of a multiple integer of the quarter wavelength (i.e., n*λ/4), such as 2.63 mm, 5.26 mm, 7.89 mm, and etc.

In another implementation, using much smaller antenna sizes, transmit antennas 214a through 214n in phased array antenna panel 202 may be configured to transmit signals in the 60 GHz frequency range, while receive antennas 212a through 212y in phased array antenna panel 202 may also be configured to receive signals in the 60 GHz frequency range. In that implementation, transmit antennas 214a through 214n and receive antennas 212a through 212y in phased array antenna panel 202 may have substantially equal sizes (that are both generally smaller than antenna sizes used in 5G communications).

In the present implementation, phased array antenna panel 202 is a flat panel array employing receive antennas 212a through 212y and transmit antennas 214a through 214n, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106a and 106b in FIG. 1) associated with receive antennas 212a through 212y. In one implementation, the transmission beam is formed fully electronically by means of phase and amplitude control circuits, for example, in RF front end circuits (such as RF front end chips 106c and 106d in FIG. 1) associated with transmit antennas 214a through 214n. Thus, phased array antenna panel 202 can provide for beamforming for both reception and transmission without the use of any mechanical parts, thereby reducing signal delay, implementation cost and complexity.

Figure 2E:
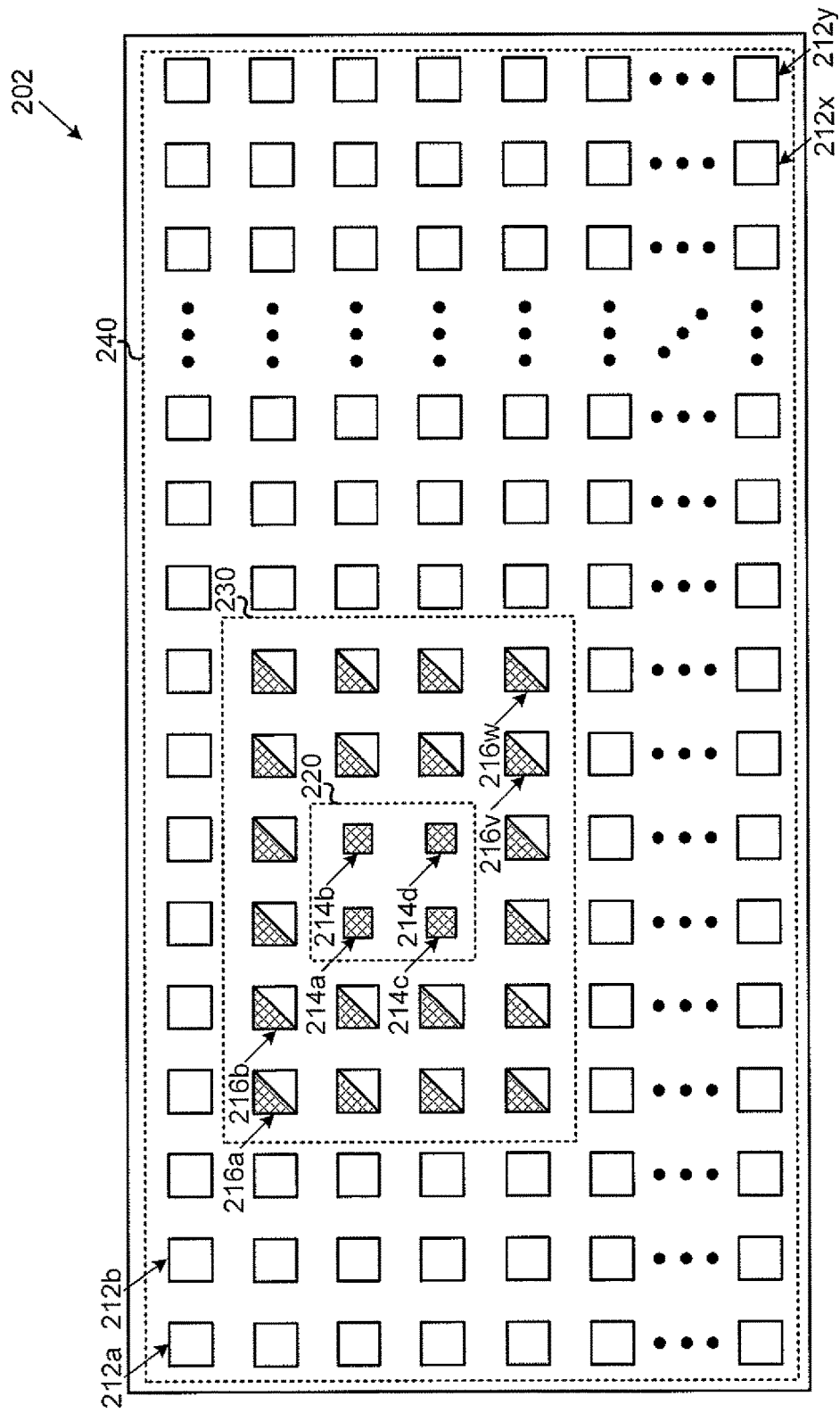

Referring now to FIG. 2E, FIG. 2E illustrates a top plan view of a portion of a phased array antenna panel of an exemplary wireless transceiver according to one implementation of the present application. As illustrated in FIG. 2E, phased array antenna panel 202 includes receive antennas, such as receive antennas 212a, 212b, 212x and 212y (collectively referred to as receive antennas 212a through 212y). Phased array antenna panel 202 also includes transmit antennas, such as transmit antennas 214a, 214b, 214c and 214d (collectively referred to as transmit antennas 214a through 214d). Phased array antenna panel 202 further includes reconfigurable receive/transmit antennas, such as reconfigurable receive/transmit antennas 216a, 216b, 216v and 216w (collectively referred to as reconfigurable receive/transmit antennas 216a through 216w).

As illustrated in FIG. 2E, receive antennas 212a through 212y are in receive configuration 240, which includes a cluster of receive antennas. Also, transmit antennas 214a through 214d are in transmit configuration 220, which includes a rectangular cluster of transmit antennas. In addition, reconfigurable receive/transmit antennas 216a through 216w are in reconfigurable receive/transmit configuration 230, which includes a rectangular cluster of reconfigurable receive/transmit antennas. As shown in FIG. 2E, the cluster of transmit antennas in transmit configuration 220 is surrounded by the cluster of reconfigurable receive/transmit antennas in reconfigurable receive/transmit configuration 230. The cluster of reconfigurable receive/transmit antennas in reconfigurable receive/transmit configuration 230 is in turn surrounded by the cluster of receive antennas in receive configuration 240.

In the present implementation, a wireless transceiver is configured to dynamically assign reconfigurable receive/transmit antennas 216a through 216w so that each of reconfigurable receive/transmit antennas 216a through 216w may operate in either the transmission mode or in the reception mode. As a consequence, the total number of transmit antennas or the total number of receive antennas in phased array antenna panel 202 may be increased. In other words, depending on the specific needs of a particular application, the wireless transceiver may assign one or more reconfigurable receive/transmit antennas 216a through 216w to operate in the transmission mode along with transmit antennas 214a through 214d to transmit signals, or operate in the reception mode along with receive antennas 212a through 212y to receive signals. In one implementation, the number of receive antennas in receive configuration 240, the number of reconfigurable receive/transmit antennas in reconfigurable receive/transmit configuration 230, and the number of transmit antennas in transmit configuration 220a may vary to suit the specific needs of a particular application.

As illustrated in FIG. 2E, transmit antennas 214a through 214d may each have a substantially square shape, that is slightly smaller than receive antennas 212a through 212y. Similar to FIG. 2A, this is because the receive frequency and the transmit frequency of the wireless transceiver may be set to be different to ensure signal isolation between the receive and transmit signals. For example, the receive frequency and the transmit frequency may be separated by approximately 2 GHz to ensure signal isolation.

In one implementation, receive antennas 212a through 212y, transmit antennas 214a through 214d, and reconfigurable receive/transmit antennas 216a through 216w in phased array antenna panel 202 may be used in conjunction with 5G wireless communications (5th generation mobile networks or 5th generation wireless systems), such as wireless transceivers operating in a frequency range of between 27.5 GHz and 29.5 GHz. In one implementation, for a wireless transceiver transmitting signals at 28.5 GHz (i.e., λ=10.52 mm), each receive antenna and transmit antenna in phased array antenna panel 202 may need an area of at least a half wavelength (i.e., λ/2=5.26 mm) by a half wavelength (i.e., λ/2=5.26 mm) to receive signals. As illustrated in FIG. 2E, receive antennas 212a through 212y and transmit antennas 214a through 214n in phased array antenna panel 202 may each have a substantially square shape having dimensions of 5.26 mm by 5.26 mm, for example. In one implementation, each adjacent pair of receive antennas and each adjacent pair of transmit antennas may be separated by a distance of a multiple integer of the quarter wavelength (i.e., n*λ/4), such as 2.63 mm, 5.26 mm, 7.89 mm, and etc.

In one implementation, each reconfigurable receive/transmit antenna in phased array antenna panel 202 may have a substantially square shape that is substantially equal to the area of each of receive antennas 212a through 212y. In another implementation, each reconfigurable receive/transmit antenna in phased array antenna panel 202 may have a substantially square shape that is substantially equal to the area of each of transmit antennas 214a through 214d. In yet another implementation, each reconfigurable receive/transmit antenna in phased array antenna panel 202 may have a substantially square shape that is greater in size than transmit antennas 214a through 214d, but smaller in size than receive antennas 212a through 212y.

In another implementation, using much smaller antenna sizes, transmit antennas 214a through 214d in phased array antenna panel 202 may be configured to transmit signals in the 60 GHz frequency range, while receive antennas 212a through 212y in phased array antenna panel 202 may also be configured to receive signals in the 60 GHz frequency range. In that implementation, transmit antennas 214a through 214d, receive antennas 212a through 212y, and reconfigurable receive/transmit antennas 216a through 216w in phased array antenna panel 202 may have substantially equal sizes (that are both generally smaller than antenna sizes used in 5G communications).

In the present implementation, phased array antenna panel 202 is a flat panel array employing receive antennas 212a through 212y, transmit antennas 214a through 214d, and reconfigurable receive/transmit antennas 216a through 216w, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106a, 106b, 106x and 106y in FIG. 1) associated with receive antennas 212a through 212y and reconfigurable receive/transmit antennas 216a through 216w. In one implementation, the transmission beam is formed fully electronically by means of phase and amplitude control circuits, for example, in RF front end circuits (such as RF front end chips 106c, 106d, 106x and 106y in FIG. 1) associated with transmit antennas 214a through 214d and reconfigurable receive/transmit antennas 216a through 216w. Thus, phased array antenna panel 202 can provide for beamforming for both reception and transmission without the use of any mechanical parts, thereby reducing signal delay, implementation cost and complexity.

Figure 2F:
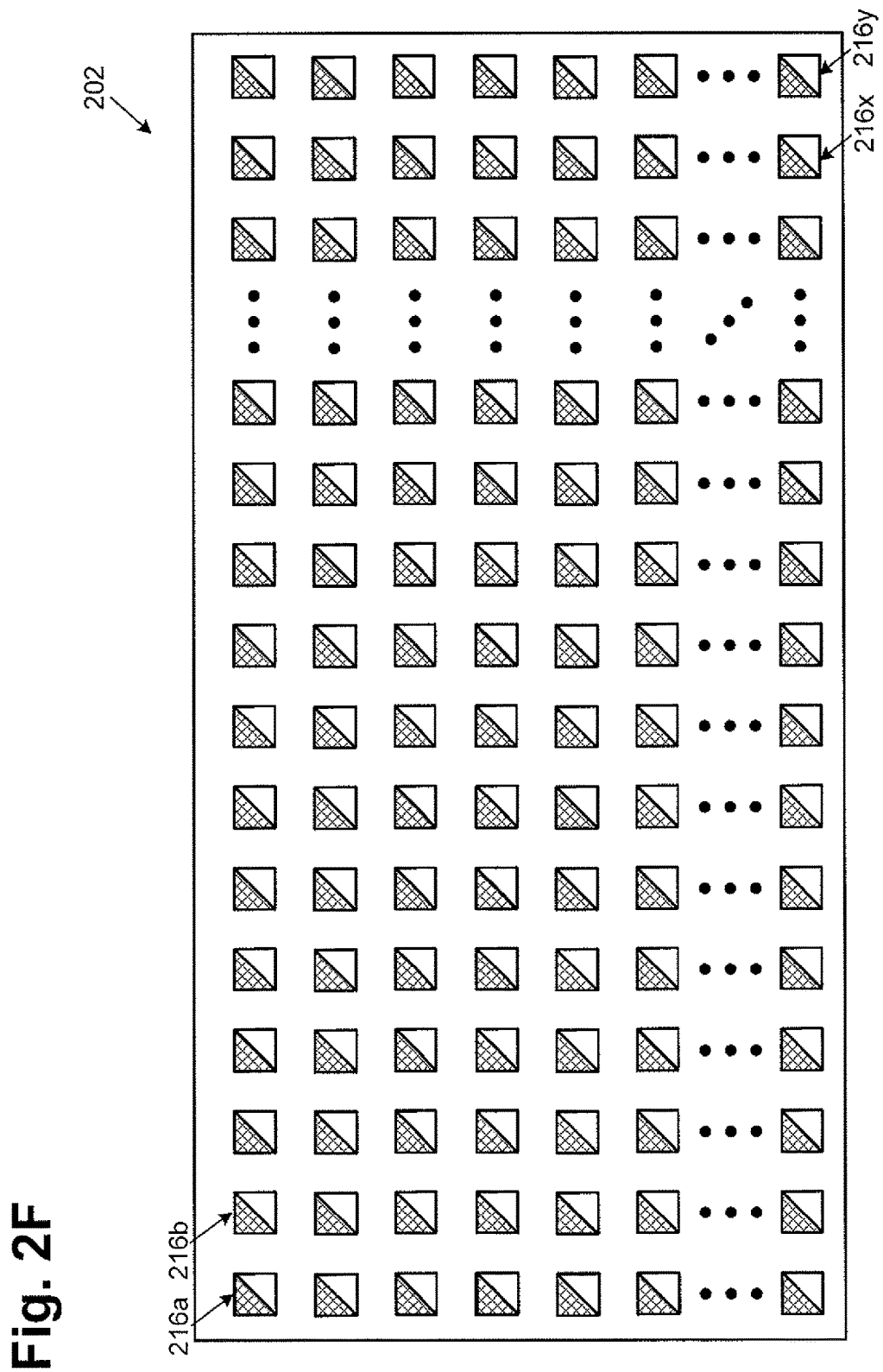

Referring now to FIG. 2F, FIG. 2F illustrates a top plan view of a portion of a phased array antenna panel of an exemplary wireless transceiver according to one implementation of the present application. As illustrated in FIG. 2F, phased array antenna panel 202 includes reconfigurable receive/transmit antennas 216a, 216b, 216x and 216y (collectively referred to as reconfigurable receive/transmit antennas 216a through 216y). In the present implementation, substantially every or in fact every antenna in phased array antenna panel 202 is reconfigurable, such that the wireless transceiver is configured to dynamically assign each of the reconfigurable receive/transmit antennas to operate in either the reception mode or the transmission mode.

For example, the wireless transceiver may dynamically assign a portion of reconfigurable receive/transmit antennas 216a through 216y to form a receive configuration to operate in the reception mode, while assign another portion of reconfigurable receive/transmit antennas 216a through 216y to form a transmit configuration to operate in the transmission mode. In one implementation, the wireless transceiver may dynamically assign reconfigurable receive/transmit antennas 216a through 216y to form one or more transmit configurations and one or more receive configurations, as shown and described with reference to FIGS. 2A through 2E above.

In one implementation, reconfigurable receive/transmit antennas 216a through 216y in phased array antenna panel 202 may be used in conjunction with 5G wireless communications (5th generation mobile networks or 5th generation wireless systems), such as wireless transceivers operating in a frequency range of between 27.5 GHz and 29.5 GHz. As illustrated in FIG. 2F, reconfigurable receive/transmit antennas 216a through 216y may each have a substantially square shape. In one implementation, for a wireless transceiver transmitting signals at 28.5 GHz (i.e., $\lambda$=10.52 mm), each of reconfigurable receive/transmit antennas 216a through 216y in phased array antenna panel 202 may need an area of at least a half wavelength (i.e., $\lambda$=5.26 mm) by a half wavelength (i.e., $\lambda/2$=5.26 mm) to receive or transmit signals. As illustrated in FIG. 2F, reconfigurable receive/transmit antennas 216a through 216y in phased array antenna panel 202 may each have a substantially square shape having dimensions of 5.26 mm by 5.26 mm, for example. In another implementation, each of reconfigurable receive/transmit antennas 216a through 216y in phased array antenna panel 202 may be configured to transmit or receive signals in the 60 GHz frequency range using smaller antenna sizes.

In the present implementation, phased array antenna panel 202 is a flat panel array employing reconfigurable receive/transmit antennas 216a through 216y, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106x and 106y in FIG. 1) associated with a portion of reconfigurable receive/transmit antennas 216a through 216y. In one implementation, the transmission beam is formed fully electronically by means of phase and amplitude control circuits, for example, in RF front end circuits (such as RF front end chips 106x and 106y in FIG. 1) associated with another portion reconfigurable receive/transmit antennas 216a through 216y. Thus, phased array antenna panel 202 can provide for beamforming for both reception and transmission without the use of any mechanical parts.

Figure 3:
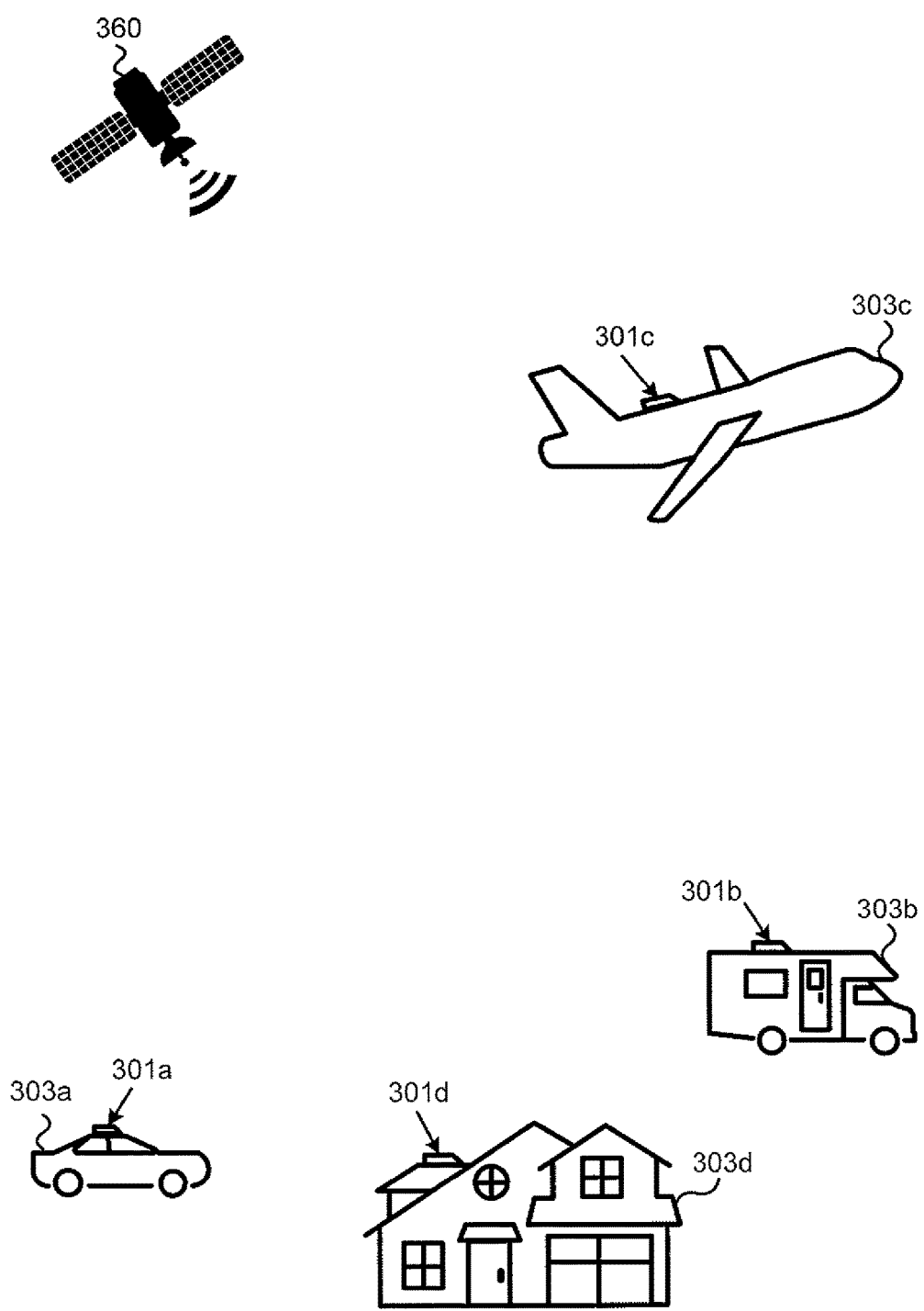
FIG. 3 is an exemplary wireless communications system utilizing exemplary wireless transceivers according to one implementation of the present application.

Referring now to FIG. 3, FIG. 3 illustrates an exemplary wireless communications system utilizing exemplary wireless transceivers according to one implementation of the present application. As illustrated in FIG. 3, satellite 360 is configured to communicate (e.g., transmit and receive data and/or signals) with various wireless transceivers, such as wireless transceiver 301a mounted on car 303a, wireless transceiver 301b mounted on recreational vehicle 303b, wireless transceiver 301c mounted on airplane 303c and wireless transceiver 301d mounted on house 303d. It should be understood that car 303a, recreational vehicle 303b and airplane 303c may each be moving, thereby causing a change in position of corresponding wireless transceivers 301a through 301c. It should be understood that, although house 303d can be stationary, the relative position of wireless transceiver 301d to satellite 360 may also change, for example, due to wind or other factors. In the present implementation, wireless transceivers 301a through 301d may each correspond to wireless transceiver 101 in FIG. 1, where each of wireless transceivers 301a through 301d may include a phased array antenna panel, such as any of the phased array antenna panels 202 in FIGS. 2A through 2F, for concurrently transmitting and receiving wireless signals, as discussed above.

Figure 4A:
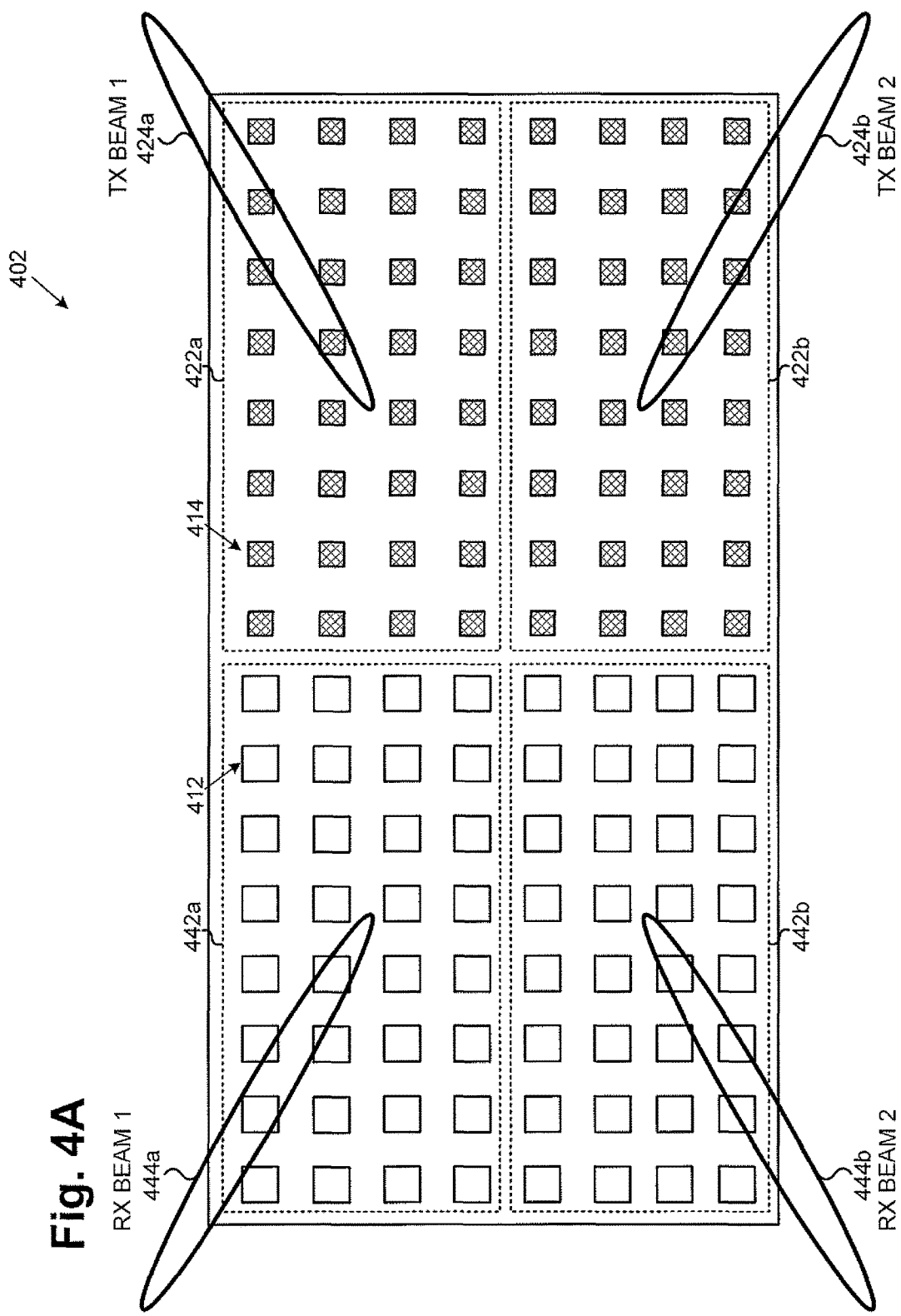

Referring now to FIG. 4A, FIG. 4A illustrates a top plan view of a portion of a phased array antenna panel of an exemplary wireless transceiver according to one implementation of the present application. As illustrated in FIG. 4A, phased array antenna panel 402 includes receive antennas 412 and transmit antennas 414. Receive antennas 412 form a receive configuration covering the left half of phased array antenna panel 402, and transmit antennas 414 form a transmit configuration covering the right half of phased array antenna panel 402. In one implementation, the total number of receive antennas 412 is greater than the total number of transmit antennas 414. In another implementation, the total number of receive antennas 412 and the total number of transmit antennas 414 may vary to suit the specific needs of a particular application.

As illustrated in FIG. 4A, transmit antennas 414 in phased array antenna panel 402 may each have a substantially square shape that is slightly smaller than receive antennas 412. This is because the receive frequency and the transmit frequency of the wireless transceiver are set to be different to ensure signal isolation between the receive and transmit signals. For example, the receive frequency and the transmit frequency may be separated by approximately 2 GHz to ensure signal isolation.

In one implementation, receive antennas 412 and transmit antennas 414 in phased array antenna panel 402 may be used in conjunction with 5G wireless communications (5th generation mobile networks or 5th generation wireless systems), such as wireless transceivers operating in a frequency range of between 27.5 GHz and 29.5 GHz. In one implementation, for a wireless transceiver transmitting signals at 28.5 GHz (i.e., $\lambda=10.52$ mm), each receive antenna and transmit antenna in phased array antenna panel 402 may need an area of at least a half wavelength (i.e., $\lambda/2=5.26$ mm) by a half wavelength (i.e., $\lambda/2=5.26$ mm) to receive signals. As illustrated in FIG. 4A, receive antennas 412 and transmit antennas 414 in phased array antenna panel 402 may each have a substantially square shape having dimensions of approximately 5.26 mm by 5.26 mm, for example. In one implementation, each adjacent pair of receive antennas and each adjacent pair of transmit antennas may be separated by a distance of a multiple integer of the quarter wavelength (i.e., $n*\lambda/4$), such as 2.63 mm, 5.26 mm, 7.89 mm, and etc.

In another implementation, using much smaller antenna sizes, transmit antennas 414 in phased array antenna panel 402 may be configured to transmit signals in the 60 GHz frequency range, while receive antennas 412 in phased array antenna panel 202 may also be configured to receive signals in the 60 GHz frequency range. In that implementation, transmit antennas 414 and receive antennas 412 in phased array antenna panel 402 may have substantially equal sizes (that are both generally smaller than antenna sizes used in 5G communications).

In the present implementation, receive antennas 412 form receive beams 444a and 444b, and transmit antennas 414 form transmit beams 424a and 424b. Phased array antenna panel 402 is a flat panel array employing receive antennas 412 and transmit antennas 414 coupled to associated active circuits to form receive beams 444a and 444b and transmit beams 424a and 424b. In one implementation, receive beams 444a and 444b and transmit beams 424a and 424b are formed fully electronically based on receive phase and amplitude information and transmit phase and amplitude information respectively, provided by a master chip (such as master chip 108 in FIG. 1). For example, RF front end chips (such as RF front end chips 106a, 106b and 106e in FIG. 1) that are connected to a master chip may provide phase and amplitude information by means of phase and amplitude control circuits therein associated with receive antennas 412 and transmit antennas 414. Thus, phased array antenna panel 402 can provide for beamforming for both reception and transmission without the use of any mechanical parts, thereby reducing signal delay, implementation cost and complexity.

As shown in FIG. 4A, the receive configuration includes receive sub-configurations 442a and 442b, and the transmit configuration includes transmit sub-configurations 422a and 422b. In the present implementation, receive sub-configuration 442a includes half of receive antennas 412 of the receive configuration, and receive sub-configuration 442b includes the other half of receive antennas 412 of the receive configuration. Likewise, transmit sub-configuration 422a includes half of transmit antennas 414 of the transmit configuration, and transmit sub-configuration 422b includes the other half of transmit antennas 414 of the transmit configuration. In the present implementation, the antennas of each sub-configuration are assigned to form one beam. Specifically, receive sub-configuration 442a forms receive beam 444a, receive sub-configuration 442b forms receive beam 444a, transmit sub-configuration 422a forms transmit beam 424a, and transmit sub-configuration 422b forms transmit beam 424b. As used herein, the term "receive configuration" refers to the receive antennas (and reconfigurable receive/transmit antennas operating in reception mode); the term "receive sub-configuration" refers to the receive antennas (and reconfigurable receive/transmit antennas operating in reception mode) corresponding to a given receive beam. Likewise, the term "transmit configuration" refers to the transmit antennas (and reconfigurable receive/ transmit antennas operating in transmission mode); the term "transmit sub-configuration" refers to the transmit antennas (and reconfigurable receive/transmit antennas operating in transmission mode) corresponding to a given transmit beam.

The sub-configurations may vary to suit the specific needs of a particular application. For example, when the receive and transmit antennas have an alternating configuration (as in FIG. 4A), or a staggered rows configuration (as in FIG. 4B), sub-configurations may comprise every other row of the configuration, every third row of the configuration, etc. In one implementation, one receive or transmit sub-configuration may include more receive antennas or more transmit antennas than another receive or transmit sub-configuration. In various implementations, receive antennas 412 may form more than two receive sub-configurations to form more than two receive beams, and transmit antennas 414 may include more than two transmit sub-configurations to form more than two transmit beams. For example, transmit antennas 414 may include five sub-configurations forming five transmit beams. Thus, especially in 5G applications, phased array antenna panel 402 can provide multiple beamforming for both reception and transmission, improving coverage to any number of users with a single transceiver.

Referring now to FIG. 4B, FIG. 4B illustrates a top plan view of a portion of a phased array antenna panel of an exemplary wireless transceiver according to one implementation of the present application. As illustrated in FIG. 4B, phased array antenna panel 402 includes receive antennas 412 and transmit antennas 414. Receive antennas 412 form receive configuration 440 covering the left half of phased array antenna panel 402, and transmit antennas 414 form transmit configuration 420 covering the right half of phased array antenna panel 402.

As shown in FIG. 4B, receive antennas 412 form receive beams 444a and 444b, and transmit antennas 414 form transmit beams 424a and 424b. Unlike the implementation of FIG. 4A, receive configuration 440 and transmit configuration 420 in FIG. 4B do not necessarily include sub-configurations, and receive antennas 412 and transmit antennas 420 are not assigned to form only one beam. In this particular implementation, each of receive antennas 412 is connected to two receive phase shifters that are within RF front end chips such as RF front end chips 106a, 106b and 106e in FIG. 1. One receive phase shifter corresponds to receive beam 444a, the other receive phase shifter corresponds to receive beam 444b. Receive antennas 412 employ the corresponding plurality of receive phase shifters such that each of receive antennas 412 contributes to forming both receive beams 444a and 444b. For example, RF front end chips (such as RF front end chips 106a, 106b and 106e in FIG. 1) may include a set of receive phase shifters dedicated to forming receive beam 444a and another set of receive phase shifters dedicated to forming receive beam 444b. Each of receive antennas 412 connects to two receive phase shifters, one from each set. The receive antenna combines the receive phase information provided by both receive phase shifters, and the receive antenna contributes to forming both receive beams 444a and 444b. Transmit antennas 420 are arranged in an analogous manner with respect to transmit phase shifters, that are within RF front end chips such as RF front end chips 106a, 106b and 106e in FIG. 1, to form transmit beams 424a and 424b. Thus, especially in 5G applications, phased array antenna panel 402 can provide multiple beamforming for both reception and transmission, improving coverage to any number of users with a single transceiver.

In one implementation, some antennas are connected to corresponding pluralities of phase shifters that are within RF front end chips such as RF front end chips 106a, 106b and 106e in FIG. 1, while other antennas are each connected to a single phase shifter that is within RF front end chips such as RF front end chips 106a, 106b and 106e in FIG. 1. In one implementation phased array antenna panel 402 may include sub-configurations, and each sub-configuration may form multiple beams by connecting a corresponding plurality of phase shifters to each antenna. Phased array antenna panel 402 in FIG. 4B may have any of the other implementations and advantages discussed above with reference to phased array antenna panel 402 in FIG. 4A.

Figure 5A:
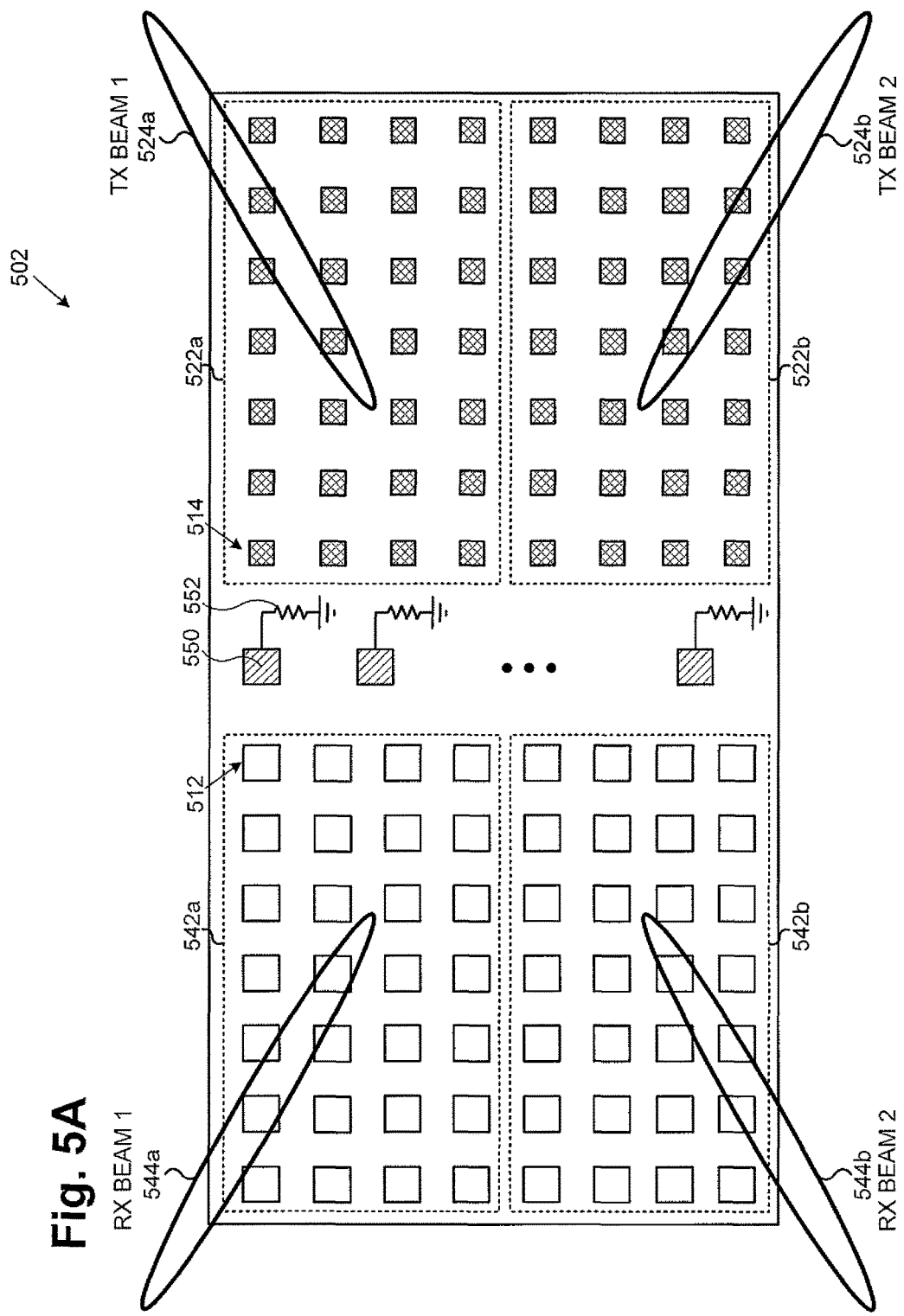

Referring now to FIG. 5A, FIG. 5A illustrates a top plan view of a portion of a phased array antenna panel of an exemplary wireless transceiver according to one implementation of the present application. As illustrated in FIG. 5A, phased array antenna panel 502 includes receive antennas 512 forming receive sub-configurations 542a and 542b, transmit antennas 514 forming transmit sub-configurations 522a and 522b, dummy antennas 550, and terminating resistor 552. Phased array antenna panel 502 in FIG. 5A may generally correspond to phased array antenna panel 402 in FIG. 4A, except that phased array antenna panel 502 in FIG. 5A includes dummy antennas 550 and terminating resistors 552.

As shown in FIG. 5A, dummy antennas 550 are situated between receive sub-configurations 542a and 542b and transmit sub-configurations 522a and 522b. Dummy antennas 550 are arranged in a row, which may be a row of eight dummy antennas 550, a row of sixteen dummy antennas 550, or any other number of dummy antennas 550. In one implementation, for a wireless transceiver operating at 28.5 GHz (i.e., λ=10.52 mm), each dummy antenna may need an area of at least of at least a half wavelength (i.e., λ/2=5.26 mm) by a half wavelength (i.e., λ/2=5.26 mm). As illustrated in FIG. 5A, dummy antennas 550 may each have a substantially square shape having dimensions of 5.26 mm by 5.26 mm, for example. In one implementation, each adjacent pair of dummy antennas 550 may be separated by a distance of a multiple integer of the quarter wavelength (i.e., n*λ/4), such as 2.63 mm, 5.26 mm, 7.89 mm, and etc.

In one implementation, dummy antennas 550 may be arranged in a pattern other than a row. For example, when the receive and transmit antennas have cluster configuration (as in FIGS. 2C, 2D, and 2E), dummy antennas 550 may be arranged to partially surround the cluster, or substantially surround the cluster. In one implementation, dummy antennas 212 may be aligned with receive antennas 512 or transmit antennas 514. In one implementation, the distance between each dummy antenna and an adjacent dummy antenna might not be a fixed distance. Multiple rows of dummy antennas 550 may be situated between receive sub-configurations 542a and 542b and transmit sub-configurations 522a and 522b in phased array antenna panel 502.

As illustrated in FIG. 5A, dummy antennas 550 are connected through terminating resistors 552 to ground. Terminating resistors 552 may be, for example, surface mount resistors. Terminating resistors 552 may be impedance matched to dummy antennas 550. For example, each of terminating resistors 552 and dummy antennas 550 may have an impedance of fifty ohms (i.e., 50Ω). By situating dummy antennas 552 between receive sub-configurations 542a and 542b and transmit sub-configurations 522a and 522b and connecting dummy antennas 550 to terminating resistors 552, phased array antenna panel 502 captures and dissipates offending transmit signals that would otherwise interfere with reception of desired receive beams 544a and 544b. Significantly, phased array antenna panel 502 can capture and dissipate offending transmit signals at the edges of receive sub-configurations 542a and 542b and transmit sub-configurations 522a and 522b where the coupling is usually strongest. In addition, where phased array antenna panel 502 has multiple rows of receive antennas 512 and transmit antennas 514, increasing the number of antennas decreases the percentage of the total area that dummy antennas 550 occupy in phased array antenna panel 502. Thus, dummy antennas 550 are more efficient for larger panels.

Referring now to FIG. 5B, FIG. 5B illustrates a top plan view of a portion of a phased array antenna panel of an exemplary wireless transceiver according to one implementation of the present application. As illustrated in FIG. 5B, phased array antenna panel 502 includes receive antennas 512 forming receive configuration 540, transmit antennas 514 forming transmit configuration 520, dummy antennas 550, and terminating resistor 552. Phased array antenna panel 502 in FIG. 5B may generally correspond to phased array antenna panel 402 in FIG. 4B, except that phased array antenna panel 502 in FIG. 5B includes dummy antennas 550 and terminating resistors 552. Dummy antennas 550 and terminating resistors 552 in FIG. 5B may have any of the other implementations and advantages discussed above with reference to dummy antennas 550 and terminating resistors 552 in FIG. 5A.

Figure 6A:
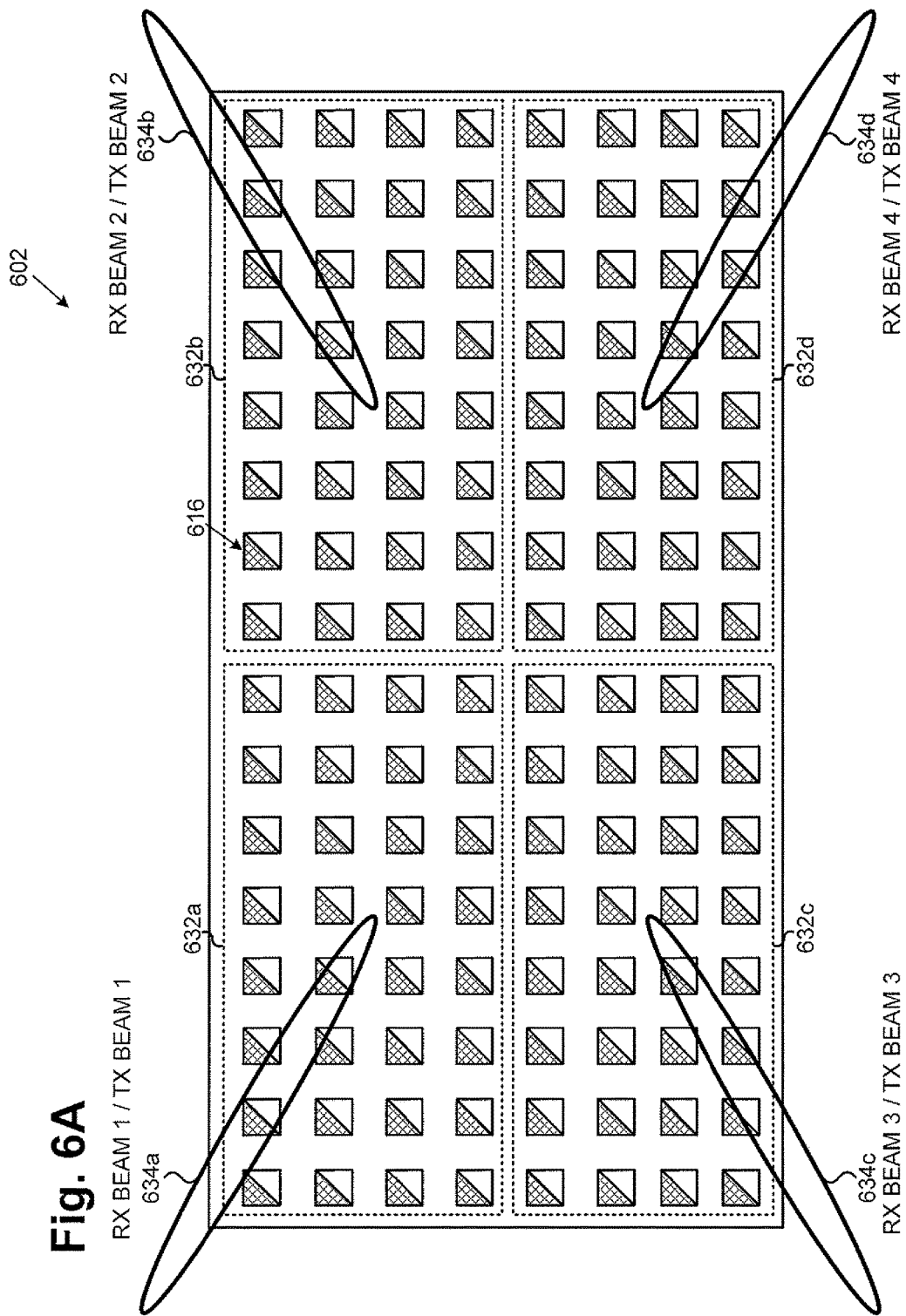
FIGS. 6A and 6B illustrate top plan views of portions of phased array antenna panels of exemplary wireless transceivers according to various implementations of the present application.

Referring now to FIG. 6A, FIG. 6A illustrates a top plan view of a portion of a phased array antenna panel of an exemplary wireless transceiver according to one implementation of the present application. As illustrated in FIG. 6A, phased array antenna panel 602 includes reconfigurable receive/transmit antennas 616 forming reconfigurable receive/transmit sub-configurations 632a, 632b, 632c, and 632d. Phased array antenna panel 602 in FIG. 6A may generally correspond to phased array antenna panel 402 in FIG. 4A, except that phased array antenna panel 602 in FIG. 6A includes reconfigurable receive/transmit antennas 616, rather than receive antennas or transmit antennas (as was the case in FIG. 4A). As a consequence, the total number of the transmit antennas or the total number of the receive antennas on phased array antenna panel 602 can be increased. The size and arrangement of reconfigurable receive/transmit sub-configurations 632a, 632b, 632c, and 632d can be dynamically altered. Moreover, reconfigurable receive/transmit beams 634a, 634b, 634c, and 634d can readily switch between reception mode and transmission mode. Reconfigurable receive/transmit antennas 616 in FIG. 6A may have any of the other implementations and advantages discussed above with reference to reconfigurable receive/transmit antennas in FIGS. 1, 2E, and 2F.

Figure 6B:
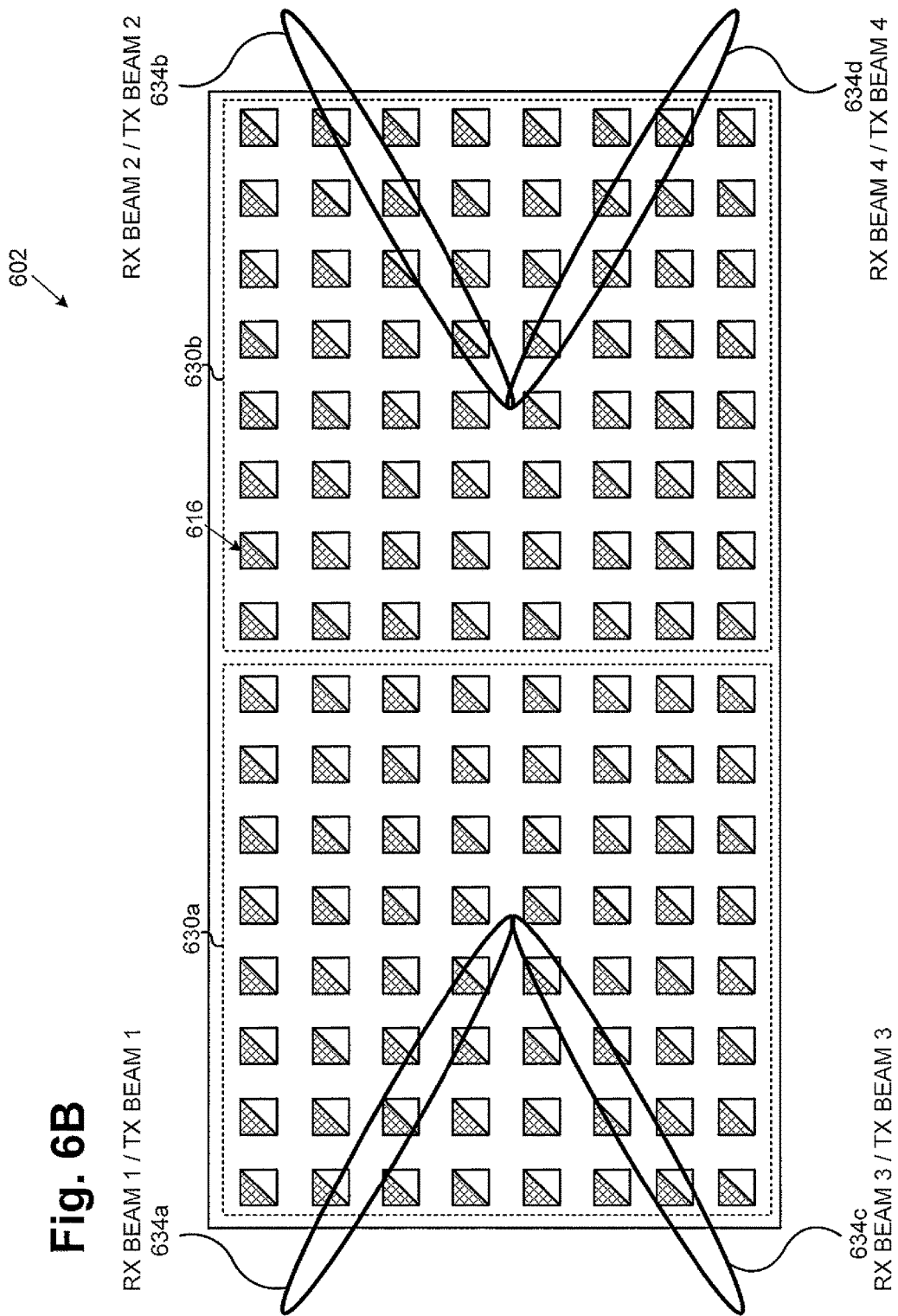

Referring now to FIG. 6B, FIG. 6B illustrates a top plan view of a portion of a phased array antenna panel of an exemplary wireless transceiver according to one implementation of the present application. As illustrated in FIG. 6B, phased array antenna panel 602 includes reconfigurable receive/transmit antennas 616 forming reconfigurable receive/transmit configurations 630a and 630b. Phased array antenna panel 602 in FIG. 6B may generally correspond to phased array antenna panel 402 in FIG. 4B, except that phased array antenna panel 602 in FIG. 5B reconfigurable receive/transmit antennas 616. Reconfigurable receive/transmit antennas 616 in FIG. 6B may have any of the other implementations and advantages discussed above with reference to reconfigurable receive/transmit antennas 616 in FIG. 6A.

Figure 7:
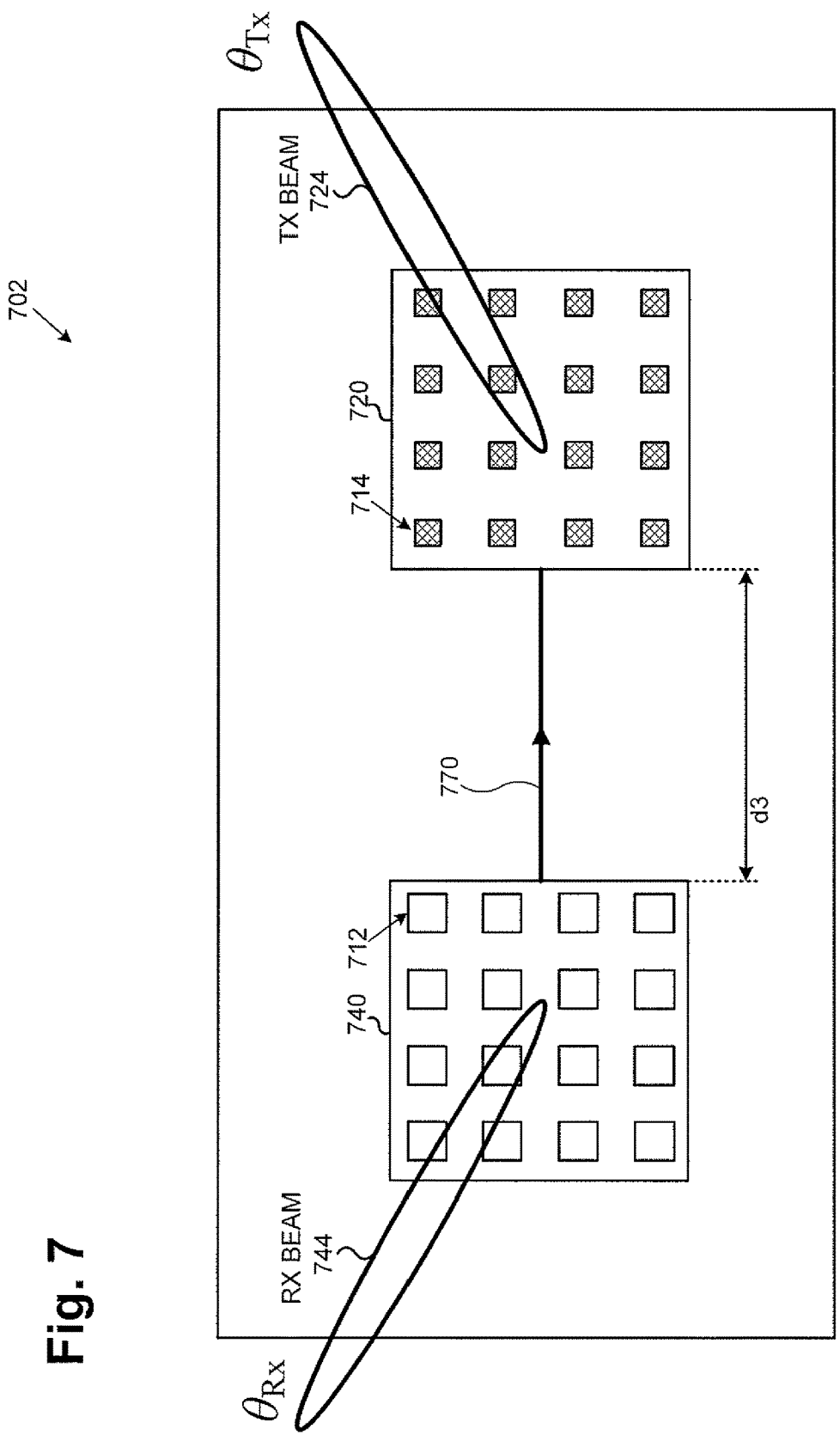
FIG. 7 illustrates a top plan view of a portion of a phased array antenna panel of an exemplary wireless transceiver according to one implementation of the present application.

Referring now to FIG. 7, FIG. 7 illustrates a top plan view of a portion of a phased array antenna panel of an exemplary wireless transceiver according to one implementation of the present application. As illustrated in FIG. 7, phased array antenna panel 702 includes receiver 740 having receive antennas 712, transmitter 720 having transmit antennas 714, and hardwire connection 770.

In the present implementation, receiver 740 and transmitter 720 share a master chip (such as master chip 108 in FIG. 1). Receiver 740 forms receive beam 744 at angle $\theta_{Rx}$ based on receive phase and amplitude information provided by the master chip, as discussed above.

Hardwire connection 770 provides receive beam 744 as an input to transmitter 720. In one implementation, hardwire 770 utilizes RF transmission to provide receive beam 744 to transmitter 720. For example, when used in conjunction with 5G wireless communications (5th generation mobile networks or 5th generation wireless systems) hardwire connection 770 may utilize RF transmission at 28.5 GHz (i.e., $\lambda$=10.52 mm) to provide receive beam 744 to transmitter 720. Receiver 740 and transmitter 720 may be equipped with additional components, such as signal conditioning circuitry and electrical connections (not shown in FIG. 7). Accordingly, receiver 740 may amplify receive beam 744 before forwarding it to hardwire connection 770. Likewise, transmitter 720 may amplify receive beam 744 after it has been forwarded by hardwire connection 770. In another implementation, hardwire connection 770 utilizes analog baseband transmission to provide receive beam 744 to transmitter 720. For example, receiver 740 may downconvert receive beam 744 before forwarding it to hardwire connection 770. In yet another implementation, hardwire connection 770 utilizes digital baseband transmission to provide receive beam 744 to transmitter 720. For example, receiver 740 may employ an analog-to-digital converter (ADC), and transmitter 720 may employ a matching digital-to-analog converter (DAC).

Transmitter 720 forms relay transmit beam 724 based on receive beam 744 provided by hardwire connection 770. For example, the relay transmit beam 724 may be an amplified and/or remapped based on receive beam 744. As a consequence, transmitter 720 can form relay transmit beam 724 as a stronger signal and/or at desired transmit beam angle $\theta_{Tx}$ independent from receive beam angle $\theta_{Rx}$. Transmitter 720 may also form relay transmit beam 724 based on transmit phase and amplitude information provided by a shared master chip. For example, the shared master chip may use receive beam 744 and information stored in memory to generate transmit phase and amplitude information for RF front end chips associated with transmitter 720. The increase the isolation between receiver 740 and transmitter 720, and thereby improve the relay operation, receiver 740 and transmitter 720 may have an isolation distance d3 greater than or approximately 10$\lambda$. Isolation distance d3 may be kept less than or approximately 15$\lambda$, in order to decrease insertion loss and prevent noise from dominating signals. Thus, isolation distance d3 in FIG. 7 improves the relay operation. In one implementation, phased array antenna panel may also include dummy antennas situated between receiver 740 and transmitter 720 to reduce offensive coupling. In other implementations, receiver 740 may form a plurality of receive beams and transmitter 720 may form a plurality of relay transmit beams 724 based on the receive beams. Thus, especially in 5G applications where line of sight is blocked, phased array antenna panel 702 can efficiently form relay transmit beams 724, improving coverage to any number of users with a single transceiver.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:
1. A wireless transceiver, comprising:
a phased array antenna panel configured to produce multiple receive beams and multiple transmit beams;
receive antennas configured to form a receive configuration; and transmit antennas configured to form a transmit configuration,
wherein said receive antennas are configured to form a plurality of receive beams based on receive phase information and receive amplitude information,
wherein said receive phase information and said receive amplitude information are provided by a master chip in said phased array antenna panel,
wherein said transmit antennas are configured to form a plurality of transmit beams based on transmit phase information and transmit amplitude information;
wherein said transmit phase information and said transmit amplitude information are provided by said master chip in said phased array antenna panel,
wherein said receive configuration comprises a plurality of receive sub-configurations, each of said plurality of receive sub-configurations forms at least one of said plurality of receive beams,
wherein said transmit configuration comprises a plurality of transmit sub-configurations, each of said plurality of transmit sub-configurations forms at least one of said plurality of transmit beams, and
wherein said receive phase information, said receive amplitude information, said transmit phase information and said transmit amplitude information are provided by RF front end chips that are connected to said master chip.

2. The wireless transceiver of claim 1, further comprising at least one dummy antenna between said receive configuration and said transmit configuration, and
wherein said at least one dummy antenna is coupled to a terminating resistor.

3. The wireless transceiver of claim 1, wherein said wireless transceiver is configured to operate in a frequency range of between 27.5 GHz and 29.5 GHz.

4. The wireless transceiver of claim 1, wherein said wireless transceiver is configured to dynamically assign reconfigurable receive and transmit antennas to increase at least one of a number of said transmit antennas or a number of said receive antennas.

* * * * *